(12) United States Patent
Broadbent et al.

(10) Patent No.: US 12,398,350 B2
(45) Date of Patent: Aug. 26, 2025

(54) BREWING

(71) Applicant: THE GREATER GOOD FRESH BREWING CO LTD, London (GB)

(72) Inventors: Ralph Broadbent, London (GB); Alex Dixon, London (GB); Simon Mawbey, London (GB); Jed Taylor, London (GB); Duncan Gordon, London (GB)

(73) Assignee: THE GREATER GOOD FRESH BREWING CO LTD, London (GB)

( * ) Notice: Subject to any disclaimer, the term of this patent is extended or adjusted under 35 U.S.C. 154(b) by 515 days.

(21) Appl. No.: 17/635,588

(22) PCT Filed: Aug. 17, 2020

(86) PCT No.: PCT/GB2020/051964
§ 371 (c)(1),
(2) Date: Feb. 15, 2022

(87) PCT Pub. No.: WO2021/032965
PCT Pub. Date: Feb. 25, 2021

(65) Prior Publication Data
US 2022/0267701 A1 Aug. 25, 2022

(30) Foreign Application Priority Data

Aug. 16, 2019 (GB) ..................................... 1911811
Jan. 22, 2020 (GB) ..................................... 2000948

(51) Int. Cl.
*C12C 13/10* (2006.01)
*C12C 11/00* (2006.01)
(Continued)

(52) U.S. Cl.
CPC ............ *C12C 13/10* (2013.01); *C12C 11/006* (2013.01); *C12C 13/02* (2013.01); *C12H 1/22* (2013.01)

(58) Field of Classification Search
CPC ....... C12C 13/02; C12C 13/10; C12C 11/003; C12C 11/006; C12H 1/22; C12G 3/02
(Continued)

(56) References Cited

U.S. PATENT DOCUMENTS 694,584 A 3/1902 Selg et al.
2,638,916 A * 5/1953 Scheiwer ............ B64D 37/005
137/614.04
(Continued)

FOREIGN PATENT DOCUMENTS

CA 2227023 A1 9/1999
CN 201141026 10/2008
(Continued)

OTHER PUBLICATIONS

International Search Report and Written Opinion issued in corresponding PCT Patent Application No. PCT/GB2020/051964, dated Jan. 15, 2021.

*Primary Examiner* — Reginald Alexander
(74) *Attorney, Agent, or Firm* — Jacob M. Ward; Ward Law Office LLC

(57) ABSTRACT

An apparatus for brewing and dispensing a beverage comprising a fermentation container for containing and fermenting a beverage, the fermentation container comprising a first outlet, and a collector for collecting waste from the fermentation container, the collector being attachable to and detachable from the fermentation container at the first outlet.

19 Claims, 24 Drawing Sheets

(51) Int. Cl.
*C12C 13/02* (2006.01)
*C12H 1/22* (2006.01)

(58) Field of Classification Search
USPC ....... 99/276, 277, 277.1, 278; 137/546, 522, 137/523; 141/351, 353, 357
See application file for complete search history.

(56) References Cited

U.S. PATENT DOCUMENTS

| | | | |
|---|---|---|---|
| 5,271,111 A * | 12/1993 | Johenning | A47C 27/085 141/357 |
| 5,729,991 A * | 3/1998 | Albertson | F16K 17/16 62/149 |
| 5,967,379 A | 10/1999 | Crossdale et al. | |
| 2011/0030810 A1 * | 2/2011 | Shellcot | B67D 3/044 137/171 |
| 2016/0326471 A1 * | 11/2016 | Aown | C12C 13/10 |
| 2016/0348046 A1 * | 12/2016 | Wood | C12H 1/22 |
| 2017/0321173 A1 * | 11/2017 | Glasgow | C12C 11/006 |
| 2018/0291319 A1 | 10/2018 | Glasgow et al. | |

FOREIGN PATENT DOCUMENTS

| | | |
|---|---|---|
| CN | 108138105 A | 6/2018 |
| GB | 2118571 A | 11/1983 |
| GB | 2123850 | 2/1984 |
| WO | 2015115914 A1 | 8/2015 |
| WO | 2017178607 A1 | 10/2017 |

* cited by examiner

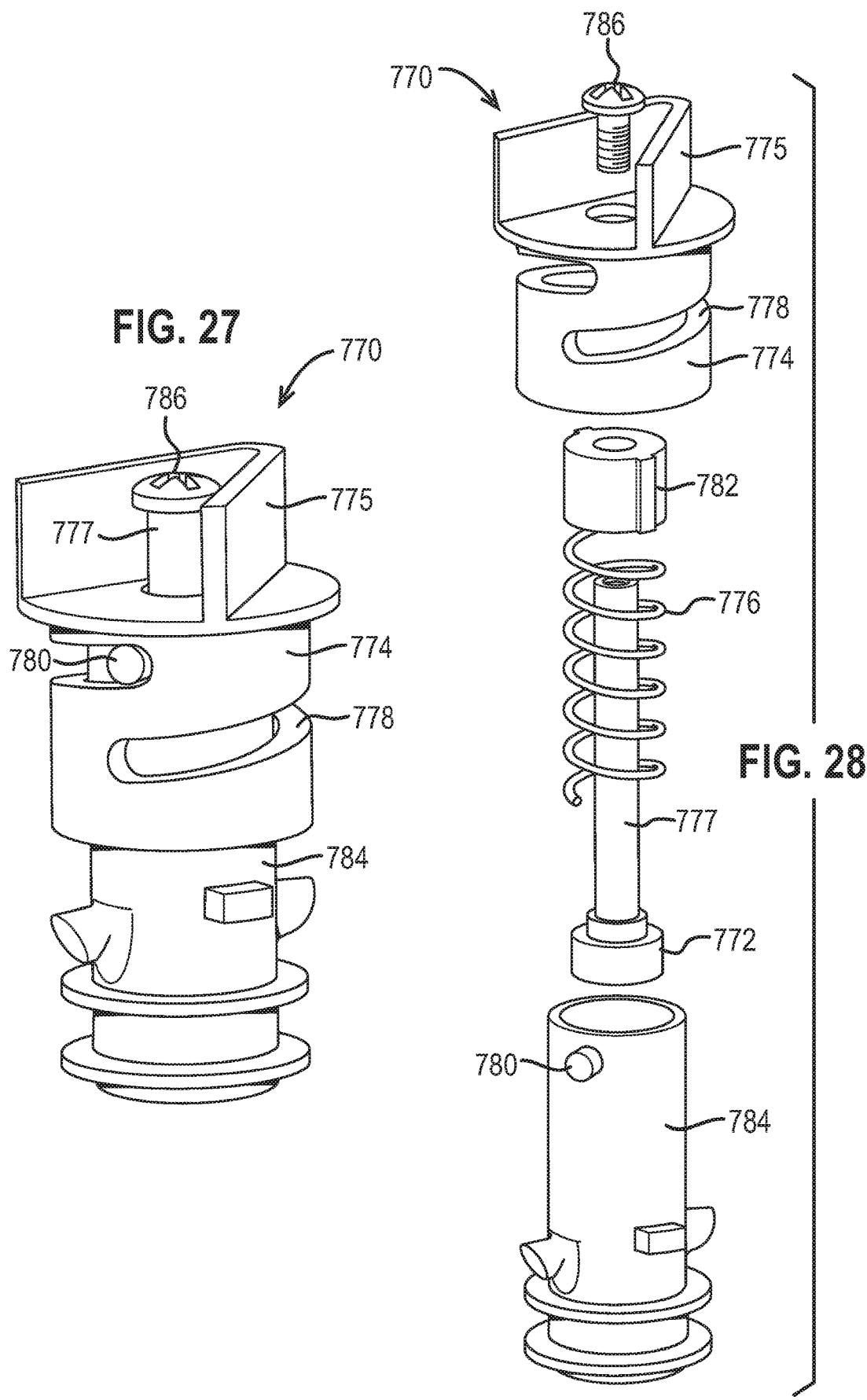

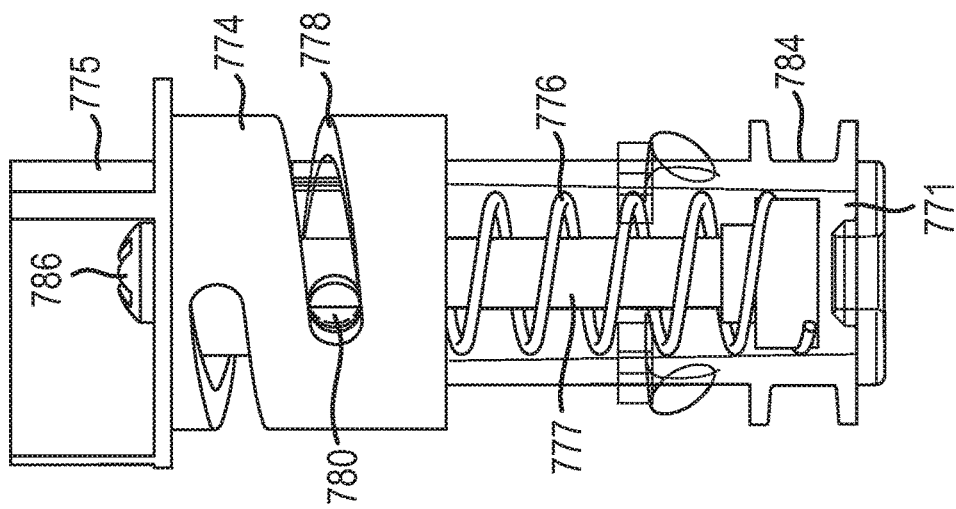
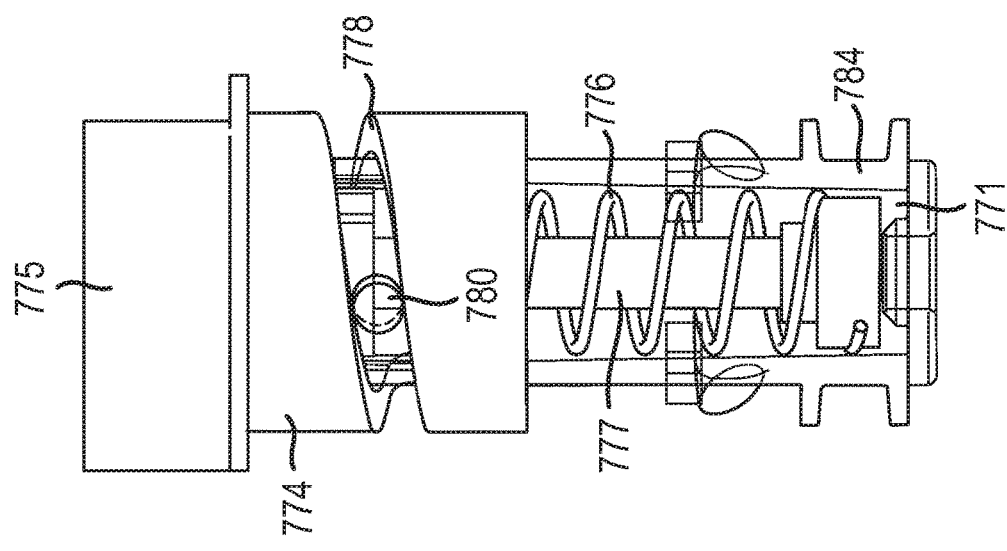
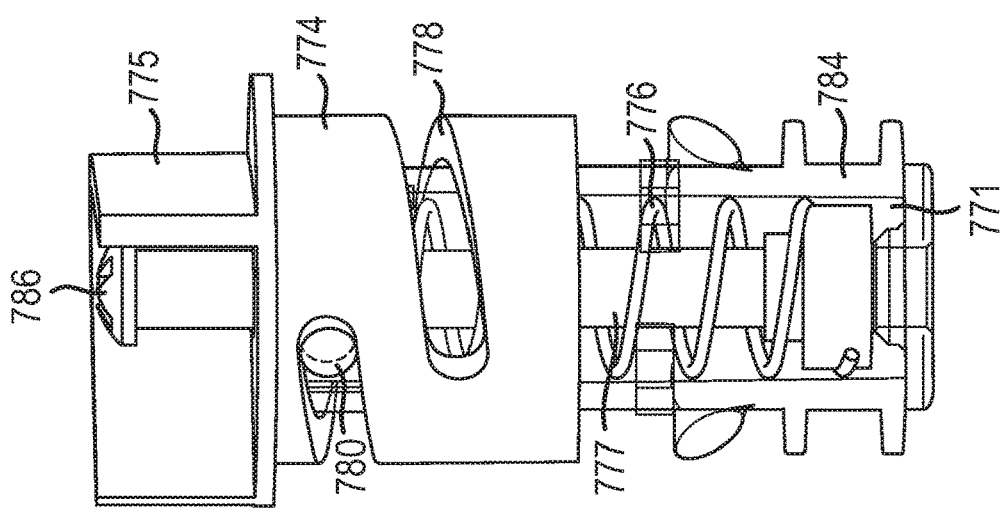

BREWING

CROSS-REFERENCE TO RELATED APPLICATIONS

This application is a national stage entry of PCT/GB2020/051964, filed Aug. 17, 2020, which claims priority to United Kingdom (GB) Application No. 1911811.6, filed Aug. 16, 2019 and United Kingdom (GB) Application No. 2000948.6, filed Jan. 22, 2020, the contents of each of which are herein incorporated by reference in their entireties.

FIELD OF THE INVENTION

The invention relates to brewing, in particular apparatuses, assemblies, kits and methods for brewing fresh beverages, such as beer and cider.

BACKGROUND OF THE INVENTION

Many people enjoy drinking alcoholic beverages, such as beer, in their own homes. Often, consumers will purchase these beverages from shops or, alternatively, order them for delivery to their homes. Both ways of purchasing alcoholic beverages have their drawbacks. When purchasing from a shop, unless the amount purchased is very small, containers for alcoholic beverages are generally large, heavy and difficult to transport. When ordering alcoholic beverages for home delivery to remove this problem, the customer will need to make sure that they are at home when the delivery is made because the containers are generally large, which is restrictive and inflexible. Unlike soft drinks, which can be provided in concentrated form (e.g. fruit squash or cordial), alcoholic beverages require individual packaging, meaning that a large quantity of alcoholic beverage bottles and cans go to landfill. Additionally, alcoholic beverages purchased by either method (shop-bought or home delivery) are often provided in packaging that is environmentally unfriendly (e.g. using plastic to hold cans together) and duty must be paid on the alcoholic beverages, which drastically inflates the purchase price for consumers.

As a result of these problems, and also as a hobby, many people now choose to brew their own beer, or other alcoholic beverages, at home. Consequently, domestic brewing kits have become popular. Usually, in such kits, yeast is added to a mixture of sugary malt extract known as wort (which may be pre-hopped) and water in a fermentation container and the container is sealed. The yeast ferments the sugars in the malt extract to produce ethyl alcohol and release carbon dioxide ($CO_2$). During fermentation, yeast settles in the bottom of the container and can easily become re-suspended in the beverage if the container is shaken, moved or turned, which ruins the beer. Because of this, once the beer has been fermented, it will sometimes be transferred to another vessel for carbonation and/or dispensing, but this normally means that not all of the available beer is used. Alternatively, settled yeast may be captured in another container or a "yeast dump" which can then be removed, but this removal risks spillage of beer, contamination of the beer remaining in the container and depressurisation of the container. Another reason why the beer is generally transferred to another container for dispensing is that the fermentation containers are generally quite tall to allow the separation of sediment, meaning that they are difficult to fit into conventional fridges. This is a problem as beer is more enjoyable when consumed chilled.

As already mentioned, the fermentation process produces $CO_2$. Some of this $CO_2$ remains in the drink to carbonate it but most of it exits the solution and is contained as a gas at the top of the container. Often, gas will be allowed to exit the container via a valve to ensure excess pressure does not build up. Furthermore, sometimes pressure is manually released (a process known as "degassing"). Degassing has the advantage that the flow of liquid from the container can be more predictable when dispensing the beverage than if the pressure within the container is very high, but it can meant that the beer goes flat more quickly. Degassing can also allow oxygen gas ($O_2$) into the liquid which means that the beer will go off more quickly. On the flip side, if the container is not degassed and the pressure remains high, the beer will go flat less quickly but the flow rate during the initial tapping from the container can be unpredictable and fast resulting in an imperfect tapping (e.g. with a large head). In short, it is challenging maintaining well-carbonated beer whilst ensuring a predictable and desirable flow rate.

Achieving a desirable flow rate can also be problematic as more and more tappings take place. As the beer is tapped repeatedly, the pressure within the container gets progressively lower, meaning that the flow rate decreases. This gets worse and worse as more tappings take place until the flow rate becomes too low to ensure a reliable and desirable pour.

There is therefore a need for apparatuses and methods that address these problems.

SUMMARY OF THE INVENTION

In accordance with the present invention, there is provided an apparatus for brewing and dispensing a beverage, such as an alcoholic beverage, comprising:
  a fermentation container for containing and fermenting a beverage, the fermentation container comprising a first outlet;
  and
  a collector for collecting waste from the fermentation container, the collector being attachable to and detachable from the fermentation container at the first outlet, wherein the first outlet is moveable between:
    a first position in which the first outlet is configured to form a pressure-tight seal to seal the fermentation container when the collector is not attached to the fermentation container; and
    a second position in which the first outlet is configured to allow fluid communication between the fermentation container and the collector when the collector is attached to the fermentation container so that waste from the fermentation container collects in the collector.

The present invention provides an apparatus for brewing and dispensing a beverage, such as an alcoholic beverage. The beverage could be beer (e.g. ale, lager), but it could be any other suitable alcoholic beverage, such as cider. The apparatus provides a fermentation container, as well as a collector for collecting waste (i.e. yeast) from the fermentation container during the fermentation process. The collector can also be referred to as a "yeast dump". Advantageously, the collector is attachable to and detachable from (i.e. removably attachable to) the fermentation container via a first outlet which allows fluid communication between the fermentation container and the collector when the collector is attached to the fermentation container but then forms a pressure-tight seal to seal the fermentation container when the collector is not connected to the fermentation container. This means that once the fermentation process has been completed, the collector can be removed from the fermentation container whilst maintaining the pressure within the fermentation container. Maintaining the pressure in the fermentation container means that the beverage in the container will last longer before going flat. Throughout the present application, where the terms "first position" and "second position" are used to describe positions adopted by a component (e.g. the first outlet), the terms "first configuration" and "second configuration" or "first arrangement" and "second arrangement" could equally be used.

The first outlet may be moveable from its first position to its second position by attaching the collector to the fermentation container. Alternatively or additionally, the first outlet may be moveable from its second position to its first position by detaching the collector from the fermentation container. In other words, attaching the collector to the fermentation container automatically establishes the fluid communication between the fermentation container and the collector. Similarly, removing the collector from the fermentation container automatically actuates the pressure-tight seal meaning that the pressure is automatically maintained within the fermentation container. The first outlet may be biased towards its first (i.e. sealed) position by pressure within the fermentation container. This results in a very convenient and user-friendly arrangement that ensures that the beverage does not go flat quickly. Maintaining the pressure in the fermentation container even when the collector has been removed (and whilst it is being removed) has further benefits. Firstly, it prevents the beverage being spilled whilst the collector is being removed. Secondly, it means that the same vessel can be used for fermentation and carbonation. $CO_2$ is released during the fermentation process and, because a pressure-tight seal is maintained even when the collector is removed, enough $CO_2$ is released, captured and retained within the fermentation container (even after the collector has been removed) that the $CO_2$ that is released during primary fermentation is the same $CO_2$ that then carbonates the beverage. This single-vessel fermentation/carbonation is a significant improvement on past apparatuses and avoids the need to inject extra $CO_2$ for carbonation (e.g. through a valve or by using $CO_2$ cartridges) which could risk depressurising the fermentation container or allowing $O_2$ or other contaminants into the container which could spoil the beverage or cause it to go off. The fermentation container may comprise angled or sloping interior walls that encourage waste, such as yeast, to move or slide down the walls of the fermentation container towards the first outlet where it can drop into the collector.

The first outlet may comprise a plug that is moveable from a first position in which the first outlet is in its first position and a second position in which the first outlet is in its second position. The plug may be biased towards its first position by pressure within the fermentation container. The plug may be moveable inwardly towards or into the fermentation container to move the plug from its first position to its second position. The plug may be configured to slide between its first and second positions. The collector may be configured to abut the plug to move it from its first position to its second position. The plug may comprise a body portion having a first surface that is a planar surface (e.g. a flange) that is configured to sealingly engage a corresponding surface (e.g. a planar surface or a flange) on an interior surface of the fermentation container to seal the fermentation container when the plug is in its first position. The plug may further comprise an elongate stem that extends from the planar surface and is in a plane perpendicular to the planar surface of the body portion of the plug, wherein the elongate stem may be configured to slide within a corresponding channel in the fermentation container as the plug moves between its first and second positions. The body portion of the plug may also comprise a second surface on an opposite side of the body portion to the first surface, wherein the second surface is cone-shaped or substantially cone-shaped, in other words it has a central tip and a sloped surface extending outwardly from the central tip to the edge of the body portion. The body portion of the plug may be circular in cross-section. The planar surface (i.e. the first surface) of the body portion may be the proximal surface of the body portion i.e. the surface that faces away from the centre of the fermentation container. The cone-shaped surface (i.e. the second surface) may be the distal surface of the body portion i.e. the surface that faces towards the centre of the fermentation container. This cone shape means that sediment (e.g. yeast) will slide off the top of the body portion of the plug to the bottom of the fermentation container from where it can drop into the collector through the first outlet. This plug arrangement provides a user-friendly and reliable means for attaching and detaching the collector whilst maintaining the pressure within the fermentation container. There are minimal moving parts meaning that maintenance is simple and the mechanism does not wear, and the combination of the surfaces on the plug and the interior of the fermentation container provides a reliable seal. Of course, the planar surface of the plug could equally sealingly engage a surface, such as a planar surface or a flange, on an exterior surface of the fermentation container to provide the pressure-tight seal, or other suitable mechanisms could be used (e.g. snap-fit, interference fit). With the combination of the elongate stem and the cone-shaped body portion, the plug can take the form of an "umbrella" shape.

The apparatus may further comprise a tap assembly that is attachable to the fermentation container for dispensing a beverage from the fermentation container. The fermentation container may comprise a second outlet and the tap assembly may be attachable to the fermentation container at the second outlet to allow fluid communication between the fermentation container and the tap assembly to dispense a beverage from the fermentation container. The collector may be configured to enclose the tap assembly when the collector is attached to the fermentation container and to expose the tap assembly when the collector is not attached to the fermentation container. The collector may be configured to prevent actuation of the tap assembly when the collector is attached to the fermentation container and to allow activation of the tap assembly when the collector is not attached to the fermentation container. The collector may be configured to abut the tap assembly when the collector is attached to the fermentation container. In other words, by enclosing the tap assembly or otherwise restricting access to the tap assembly, the collector can prevent accidental actuation of the tap assembly during the fermentation process.

In another embodiment, the tap assembly may be attachable to the fermentation container at the first outlet when the collector is not attached to the fermentation container to allow fluid communication between the fermentation container and the tap assembly to dispense a beverage from the fermentation container. In other words, the tap assembly may be attachable to the fermentation container in the same place as the collector is attachable to the fermentation container. The first outlet may be moveable from its first position to its second position by attaching the tap assembly to the fermentation container. The first outlet may be moveable from its second position to its first position by detaching the tap assembly from the fermentation container. In other words, the tap assembly can move the first outlet between its first and second positions in the same way that the collector does so. What this means is that the tap assembly and the collector can be interchangeably attached to and detached from the fermentation container, and the fact that the pressure-tight seal is automatically maintained when neither the tap assembly nor the collector is attached to the fermentation container means that pressure can be maintained within the fermentation container and contamination can be prevented.

In any of the above embodiments, the tap assembly may be attachable to the fermentation container by a resilient fit, a snap-fit or an interference fit. The tap assembly may comprise a handle that is attachable to and detachable from the tap assembly to facilitate actuation of the tap assembly. The handle may be attachable to the tap assembly magnetically. The tap assembly may be actuatable by rotating the handle about a pivot of the tap assembly. The tap assembly may be detachable from the fermentation container (e.g. for cleaning or maintenance).

The tap assembly may comprise a hood for preventing sediment (e.g. yeast) from blocking the tap assembly. The hood may comprise a barrier portion that is configured and positioned to protect the tap assembly and an angled or sloped surface that is configured to guide sediment (e.g. yeast) away from the tap assembly (i.e. the sediment slides away towards the collector under the force of gravity). In this way, the hood prevents the beverage from being spoilt and prevents the tap assembly from becoming blocked, thereby ensuring reliable dispensing of the beverage.

The fermentation container may further comprise a safety valve for allowing gas to exit the fermentation container during fermentation. The fermentation container may comprise at least one safety valve or a plurality of safety valves. The tap assembly and the safety valve may be located at diagonally opposite corners of the fermentation container when the tap assembly is attached to the fermentation container. In other words, the tap assembly (or whichever outlet or other connection point the tap assembly is attached to) and the safety valve are located on opposite sides (or substantially opposite side) of the fermentation container in two dimensions. For example, if the tap assembly is located at the front bottom corner of the fermentation container then the safety valve is located at the rear top corner of the fermentation container. Equally, if the tap assembly is located at the rear bottom corner of the fermentation container then the safety valve is located at the front top corner of the fermentation container. The skilled person will understand other similar opposing combinations. This has the advantage that no matter whether the apparatus is upright or lying on its side, beverage can be dispensed through the tap assembly and degassing can occur through the safety valve because the tap assembly is located at the bottom and the safety valve is located at the top regardless of whether the apparatus is upright or on its side. This offers significant benefits in terms of flexibility of storage and use.

In particular, this aspect of the invention means that the apparatus is well-configured to be positioned vertically during fermentation (i.e. with the safety valve at the top expelling gas upwards and the collector at the bottom collecting downward waste) and positioned horizontally during carbonation and dispensing (i.e. with the tap assembly dispensing beverage downwards). This is advantageous because it means that the apparatus is more manoeuvrable into a range of locations for carbonation and dispensing. For example, the apparatus can be positioned upright for fermentation, which is desirable because the fermentation process benefits from the effect of gravity (e.g. encouraging waste such as yeast to move downwards towards and into the collector), then the collector can be removed and the apparatus can be placed on a normal domestic refrigerator shelf for carbonation and dispensing, which is desirable because carbonation occurs more quickly in a refrigerator and the beverage is more enjoyable when cold. It would be more difficult to place the apparatus on a refrigerator shelf if it remained vertical at all times. This means that fermentation, carbonation and dispensing can all be done using the same fermentation container.

The fermentation container may have a first axis and a second axis that is perpendicular to the first axis, wherein the fermentation container may be configured to be oriented with the first axis being vertical and the second axis being horizontal during fermentation, and wherein the fermentation container may be configured to be oriented with the first axis being horizontal and the second axis being vertical for a fermented beverage to be dispensed via the tap assembly. The fermentation container may be longer along the first axis than along the second axis. These dimensions further enhance the capability for the apparatus to be placed on a domestic refrigerator shelf for carbonation and dispensing, and the capability of the fermentation container to be oriented in these directions for fermentation, carbonation and dispensing arises from the structural features of the apparatuses described herein.

The fermentation container may further comprise a dosing valve for injecting brewing ingredients, such as fresh hops, finings, additional yeast (e.g. for secondary fermentation) and flavourings (e.g. natural flavourings) into the fermentation container whilst maintaining the pressure within the fermentation container. The dosing valve may be the same feature as the safety valve. The fermentation container may be configured to use the $CO_2$ produced during primary fermentation to carbonate the beverage.

There is also provided a tap assembly for a fermentation apparatus comprising:
  an aperture for allowing passage of a fluid therethrough;
  a moveable component that is moveable between a first position in which the moveable component completely blocks the aperture to a plurality of second positions in which the moveable component only partially blocks the aperture or does not block the aperture; and
  an actuator for moving the moveable component.

As described previously, it is challenging maintaining a high pressure for well-carbonated beer whilst ensuring a predictable and desirable flow rate. The moveable component of the tap assembly can be moved to a plurality of positions covering the aperture to differing degrees (preferably continuously to allow an infinite number of positions, although discreet positions could alternatively be provided e.g. using a ratchet mechanism) to control the flow rate through the aperture. The provision of a tap assembly having a moveable component that allows a user to control the portion of the aperture that is left open for fluid to pass therethrough means that the user can easily control the flow rate depending on how high the pressure is within the fermentation container. If the pressure is high (e.g. when few tappings have taken place), a small aperture size can be chosen so that the flow rate is restrained. If the pressure is lower (e.g. after more tappings), a larger aperture can be chosen to provide a sufficient flow. This means that the pressure within the fermentation container can be kept high to begin with, resulting in well-carbonated beverage for longer.

The tap assembly may further comprise a channel in which the moveable component may be configured to slide (e.g. translate, or move in a linear direction) when moving between its first position and its second positions. The moveable component may be configured to prevent passage of fluid through the aperture when in its first position and to allow passage of fluid through the aperture when in its second positions. The passage of fluid through the aperture may be controllable by controlling the portion of the aperture that is blocked by the moveable component. The tap assembly may further comprise a biasing means configured to bias the moveable component towards its first position. The biasing means may be a spring. Biasing the moveable component in this way ensures that beverage does not leak accidentally.

The actuator may be configured to abut the moveable component to move the moveable component between its first and second positions. The actuator may comprise an arm, and the tap assembly may further comprise a pivot about which the actuator is configured to rotate. The tap assembly may further comprise a handle that may be attachable to the actuator. Such a rotational handle is compact and easy to use. The handle may be attachable to the tap assembly magnetically, which is a secure and convenient way of attaching and detaching the handle from the actuator.

The tap assembly may comprise a hood for preventing sediment (e.g. yeast) from blocking the tap assembly. The hood may comprise a barrier portion that is configured and positioned to protect the aperture and an angled or sloped surface connected to the barrier portion that is configured to guide sediment (e.g. yeast) away from the tap assembly (i.e. the sediment slides away towards the collector under the force of gravity). In this way, the hood prevent the beverage from being spoilt and prevents the tap assembly from becoming blocked, thereby ensuring reliable dispensing of the beverage.

The apparatus described above may comprise the tap assemblies described herein.

There is also provided a method comprising:
providing an apparatus comprising;
 a fermentation container for containing and fermenting a beverage; and
 a collector for collecting waste from the fermentation container, the collector being attachable to and detachable from the fermentation container;
fermenting a beverage in the fermentation container and collecting waste in the collector; and
carbonating the beverage in the fermentation container.

The apparatus may be rotated by approximately 90 degrees between the steps of fermenting the beverage and carbonating the beverage.

The method may further comprise providing a tap assembly in fluid combination with the fermentation container, and dispensing a beverage from the fermentation container via the tap assembly. The apparatus may be rotated by approximately 90 degrees between the steps of fermenting the beverage and dispensing the beverage. Additionally or alternatively, the apparatus may remain in the same orientation during the steps of carbonating the alcoholic beverage and dispensing the alcoholic beverage.

The apparatus may be placed in a refrigerator before the step of carbonating the beverage. Additionally or alternatively, the apparatus may be placed in a refrigerator before the step of dispensing the beverage.

The collector may be detached from the fermentation container before the step of carbonating the beverage. Additionally or alternatively, the collector may be detached from the fermentation container before the step of dispensing the beverage. Additionally or alternatively, the collector may be detached from the fermentation container before the apparatus is rotated by approximately 90 degrees.

The method may be used with the apparatuses described herein.

There is also provided a package containing ingredients for brewing an alcoholic beverage, wherein the package is shaped and sized so that it can fit through a standard domestic letterbox.

The package may contain ingredients for brewing beer, such as yeast, syrup and steriliser. The package may contain some or all of these. The package may be substantially cuboidal in shape. A maximum diameter of the package along a first axis may be no more than 50 mm (or approximately 50 mm) and a maximum diameter of the package along a second axis that is perpendicular or substantially perpendicular to the first axis may be no more than 350 mm (or approximately 350 mm). A maximum diameter of the package along a first axis may be no more than 50 mm (or approximately 50 mm) and a maximum diameter of the package along a second axis that is perpendicular or substantially perpendicular to the first axis may be no more than 350 mm (or approximately 350 mm). A maximum diameter of the package along a first axis may be no more than 40 mm (or approximately 40 mm) and a maximum diameter of the package along a second axis that is perpendicular or substantially perpendicular to the first axis may be no more than 300 mm (or approximately 300 mm). A maximum diameter of the package along a first axis may be no more than 35 mm (or approximately 35 mm) and a maximum diameter of the package along a second axis that is perpendicular or substantially perpendicular to the first axis may be no more than 250 mm (or approximately 250 mm). A maximum diameter of the package along a first axis may be no more than 30 mm (or approximately 30 mm) and a maximum diameter of the package along a second axis that is perpendicular or substantially perpendicular to the first axis may be no more than 250 mm (or approximately 250 mm). A maximum diameter of the package along a first axis may be no more than 25 mm (or approximately 25 mm) and a maximum diameter of the package along a second axis that is perpendicular or substantially perpendicular to the first axis may be no more than 250 mm (or approximately 250 mm). In real terms, thinking about the height and width of a standard letterbox, "height" may be the maximum diameter along the first axis and "width" may be the maximum diameter along the second axis that is perpendicular to the first axis. It will be understood that the package will also have a "length" i.e. a diameter along a third axis that is perpendicular or substantially perpendicular to both the first and second axes. However, the skilled person will understand that as long as at least two of these three maximum diameters are sufficiently small (height and width in the definitions above, and when envisaging a real-life letterbox), then the package will fit through a standard letterbox. The diameter along the third axis (i.e. the length) may be greater than the maximum diameters along the first and second axes (i.e. the height and width), although clearly this does not necessarily have to be the case.

The package of the invention is intended to contain refill ingredients and steriliser for the apparatus of the invention. The package is compact and intended for delivery through a standard domestic letterbox. This means that the consumer does not need to transport the beverage home from a shop and also does not need to be present to accept a home delivery, which would conventionally have been too large to fit through a letterbox. The package of the invention also has additional benefits for the consumer because duty would not need to be paid on the package, reducing cost. The package of the invention also has significant environmental benefits because it reduces the packaging needed for enjoyment of beverages, such as beer, at home. For example, a considerable amount of plastic is conventionally used in packaging for beverages (e.g. plastic holding cans together).

There is also provided a kit comprising the apparatus of the invention and the package of the invention.

In accordance with the present invention, there is also provided a collector for collecting waste from a fermentation container, the collector comprising;
 a chamber for containing waste; and
 an inlet for allowing waste to enter the chamber,
  wherein the inlet is movable between:
   a first configuration in which the inlet is sealed and waste is prevented from entering the chamber; and
   a second configuration in which the inlet is unsealed and waste is allowed to enter the chamber.

The collector of the invention advantageously has an inlet that can be moved between a first configuration in which the inlet is sealed and waste is prevented from entering the chamber, and a second configuration in which the inlet is unsealed and waste is allowed to enter the chamber. In this way, once the waste has been gathered in the collector during the fermentation process, the collector can be sealed off to prevent any waste (e.g. waste liquid and/or sediment) from spilling from the collector.

The inlet may comprise a stopper that is movable between a first position in which the inlet is in its first configuration and a second position in which the inlet is in its second configuration. The stopper may be movable in a direction inwardly towards the centre of the chamber when moving from its first position to its second position and the stopper may be movable in a direction outwardly away from the centre of the chamber when moving from its second position to its first position. This provides a simple and convenient arrangement for sealing and unsealing the collector at the inlet.

The stopper may be biased towards its first (i.e. sealed) position by pressure within the collector. The stopper may also comprise a float that is configured to float on waste collected within the chamber. This is advantageous because it allows the stopper to float on the waste (e.g. waste liquid and/or sediment) that has gathered in the collector during the fermentation process and rise to seal the inlet automatically. The float may be substantially hollow. The stopper may be configured to gradually release pressure from the collector to prevent the collector from becoming overpressurised if carbonated beverage remains in the collector. This can be achieved by shaping the stopper to gradually release pressure or by using the surface properties (e.g. materials) of the stopper, for example.

The stopper may further comprise a stem extending from the float at least partially through the inlet. The stem may be shaped to permit fluid flow therethrough, such as a cross-shaped cross-sectional shape, a Y-shaped cross-sectional shape or a cylindrical shape. This shape means that the stopper can permit fluid flow through the inlet when the float is not sealing the inlet.

There is also provided an apparatus comprising:
 the collector as recited in the preceding paragraphs; and
 a fermentation container for containing and fermenting a beverage, the fermentation container comprising an outlet, and the inlet of the collector being attachable to and detachable from the outlet of the fermentation container,
  wherein the inlet is configured to be in its first configuration when the fermentation container and the collector are not attached and wherein the inlet is configured to be in its second configuration when the fermentation container and the collector are attached.

This apparatus provides an advantageous arrangement in which attaching the fermentation container and the collector automatically results in the collector inlet moving from its first configuration to its second configuration to permit waste from the fermentation container to enter the collector chamber. Similarly, detaching the fermentation container and the collector automatically results in the collector inlet moving from its second configuration to its first configuration to seal the collector chamber and prevent spillage of waste from the collector.

The outlet may be moveable between:
 a first position in which the outlet is configured to form a pressure-tight seal to seal the fermentation container when the fermentation container and the collector are not attached; and
 a second position in which the outlet is configured to allow fluid communication between the fermentation container and the collector when the fermentation container and the collector are attached to the fermentation container so that waste from the fermentation container collects in the collector.

Advantageously, the collector is attachable to and detachable from (i.e. removably attachable to) the fermentation container via a first outlet which allows fluid communication between the fermentation container and the collector when the collector is attached to the fermentation container but then forms a pressure-tight seal to seal the fermentation container when the collector is not connected to the fermentation container. This means that once the fermentation process has been completed, the collector can be removed from the fermentation container whilst maintaining the pressure within the fermentation container. Maintaining the pressure within the fermentation container means that the beverage in the container will last longer before going flat.

The outlet may comprise a plug that is configured to abut the stopper to move the stopper between its first and second positions. This abutment also moves the plug between its first and second positions. In other words, when the fermentation container and the collector are attached, the plug of the fermentation container and the stopper of the collector abut each other meaning that both the plug and the stopper automatically move to their second positions to permit waste from the fermentation container to pass through the fermentation container outlet and the collector inlet to gather in the collector. Similarly, when the fermentation container and the collector are not attached (i.e. detached), the plug of the fermentation container and the stopper of the collector no longer abut each other meaning that both the plug and the stopper automatically move to their first positions to seal the fermentation container (to maintain pressure and seal the collector (to prevent spillage of waste). This automatic movement of the plug and stopper is highly advantageous and reduced the amount of user input required. The plug and the stopper may be biased towards their first and second positions by pressure within the fermentation container and the collector, respectively.

The plug may comprise an abutment portion that is shaped to permit fluid flow therethrough, such as a cross-shaped cross-sectional shape, a Y-shaped cross-sectional shape or a cylindrical shape and that is configured to abut the stopper. Having an abutment portion of the plug and a stem of the stopper that are the same shape improves the engagement or abutment between the plug and the stopper. Moreover, the plug and stopper shapes described herein permit fluid flow through the fermentation container outlet and the collector inlet when the outlet and inlet are not sealed (i.e. in their second configurations).

In accordance with the present invention, there is also provided a tap assembly for a fermentation apparatus comprising:
- a first conduit for allowing passage of a fluid therethrough;
- a second conduit for allowing passage of a fluid therethrough; and
- a movable component that is movable between a first position in which passage of fluid is only permitted through the first conduit and at least one second position in which passage of fluid is permitted through the first conduit and the second conduit.

The tap assembly of the invention advantageously provides a tap assembly that allows a fermentation container to be tapped selectively via two conduits, for example two conduits that apply different pressures to the fluid being tapped (e.g. beer). The different pressures may arise from one conduit being longer and/or narrower than the other, in other words the aspect ratio of one conduit may be greater than the other. Alternatively or additionally, the shapes or materials of the first and second conduits may result in the first and second conduits applying different pressures to the fluid being tapped. Such control of pressures is advantageous because it allows for improved control of frothing and fluid flow, resulting in a better beverage (e.g. beer).

The movable component may be movable to a plurality of second positions. The first conduit may be longer than the second conduit. The first conduit may comprise a tube configured to allow passage of fluid therethrough.

The tap assembly may further comprise an actuator for moving the movable component and a handle coupled to the actuator. The handle may be configured to be moved a first distance to permit passage of fluid through the first conduit only and a second distance to allow passage of fluid through the first and second conduits. This arrangement, along with the fact that the first and second conduits apply different resistances to the fluid being tapped, allows for optimal frothing and fluid flow throughout the entire tapping procedure, even as the pressure within the fermentation container decreases. For example, where the first conduit applies a greater resistance to fluid flowing through it than the second conduit, the handle can be moved a first distance whilst fluid passes through the first conduit only to ensure that the fluid flow is not too fast at high pressure and that the beverage (e.g. beer) is not too frothy. Once the pressure within the fermentation container has reduced by a certain amount, the handle can be moved a second distance and fluid flows through both the first and second conduits. This ensures sufficient fluid flow even at low pressures within the fermentation container because the second conduit applies a lower resistance to the fluid being tapped than the first conduit.

The movable component may completely block the second conduit when the movable component is in its first position, and the movable component may allow passage of fluid through the second conduit when the movable component is in one of its second positions. The passage of fluid through the second conduit may be controllable by controlling the portion of the second conduit that is blocked by the moveable component.

As described previously, it is challenging maintaining a high pressure for well-carbonated beer whilst ensuring a predictable and desirable flow rate. The moveable component of the tap assembly can be moved to a plurality of positions covering the second conduit to differing degrees (preferably continuously to allow an infinite number of positions, although discreet positions could alternatively be provided e.g. using a ratchet mechanism) to control the flow rate through the second conduit. The provision of a tap assembly having a moveable component that allows a user to control the portion of the second conduit that is left open for fluid to pass therethrough means that the user can easily control the flow rate depending on how high the pressure is within the fermentation container. If the pressure is high (e.g. when few tappings have taken place), a small second conduit size can be chosen so that the flow rate is restrained. If the pressure is lower (e.g. after more tappings), a larger second conduit can be chosen to provide a sufficient flow. This means that the pressure within the fermentation container can be kept high to begin with, resulting in well-carbonated beverage for longer.

The handle may be attachable to the tap assembly magnetically.

In accordance with the present invention, there is also provided a tap assembly comprising:
- a tap holder; and
- a tap that is removably attachable to the tap holder,
  wherein the tap is rotatable relative to the tap holder between a locked position in which removal of the tap from the tap holder is prevented and an unlocked position in which removal of the tap from the tap holder is permitted.

The tap assembly of the invention serves two key purposes. Firstly, it ensures that the user properly attaches the tap to the tap holder before tapping takes place. Secondly, it ensures that the tap is not accidentally detached from the tap holder once the tap has been attached. Both of these results are important in ensuring proper tapping and preventing spillage or danger from the tap becoming detached accidentally.

The tap may be rotatable relative to the tap holder in a first direction to move the tap from its unlocked position to its locked position and in a second direction to move the tap from its locked position to its unlocked position. The tap may be prevented from moving further in the first direction when the tap is in its locked position. This prevents damage that could result from a user attempting to attach the tap to the tap holder using excessive force and also indicates to the user when the tap have been attached properly. The tap may comprise a protrusion extending from the tap and the tap holder may comprise a channel, wherein the protrusion may be configured to translate within the channel as the tap moves between its locked position and its unlocked position, and wherein the channel may be configured to retain the protrusion when the tap is in its locked position. In other words, to attach the tap to the tap holder, the user must position the tap with the protrusion adjacent to the channel of the tap holder and then rotate the tap so that the protrusion moves along the channel (i.e. rotating the tap from its unlocked position to its locked position). The channel of the tap holder then serves the additional purpose of preventing detachment of the tap from the tap holder by retaining the protrusion within the channel. This prevents the tap from shooting from the tap holder at pressure even if the user incorrectly installs the tap. The tap holder may comprise a detent that is configured to abut the protrusion when the tap is in its locked position to prevent the tap from moving further in the first direction when the tap is in its locked position. This prevents damage that could result from a user attempting to attach the tap to the tap holder using excessive force and also indicates to the user when the tap have been attached properly.

The tap assembly may further comprise a secondary retention means configured to retain the tap in its locked position, wherein the secondary retention means may be configured to be engaged automatically when the tap is moved to its locked position, and wherein the secondary retention means may be configured to be disengaged by moving the tap axially towards the tap holder so that the tap can be moved to its unlocked position. The secondary retention means may be a resilient clip, a pair of resilient clips or a plurality of resilient clips and may provide an additional layer of safety by preventing accidental removal of the tap from the tap holder. When it is desired to remove the tap from the tap holder, the user pushes the tap axially into the tap holder to disengage the secondary retention feature and then the tap may be rotated from its locked position to its unlocked position to permit removal of the tap from the tap holder. The requirement to move the tap first axially and then rotationally to detach the tap from the tap holder further enhances the safety of the arrangement because this is a deliberate motion that would not occur accidentally.

The features of the tap assembly may be combined with any of the features of the other tap assemblies described herein.

In accordance with the present invention, there is also provided a valve for a fermentation container comprising:
an aperture;
a stopper configured to at least partially seal the aperture; and
an actuator coupled to the stopper,
wherein the actuator is configured to apply variable force to the stopper to vary the resistance of the valve.

The provision of a valve where the resistance of the valve can be varied is highly advantageous as this allows for the pressure within the fermentation container to be controlled and varied. This is important as it means that a wide variety of beverages (e.g. lagers, ciders, bitters, stouts, ales) can be fermented at their optimal pressure, resulting in the optimal carbonation. For example, a lager would be brewed at high pressure for a greater degree of carbonation whereas a stout would be brewed at low pressure for little or no carbonation.

The valve may further comprise a spring arranged between the actuator and the stopper, wherein the actuator may be configured to apply variable force to the spring to variably compress the spring, and wherein the spring may be configured to apply variable force to the stopper to vary the resistance of the valve. In other words, the resistance of the valve (and therefore the pressure within the fermentation container) can be controlled and varied by varying the compression of the spring. The spring may be a compression spring, a helical spring, a leaf spring or any other suitable spring or biasing means.

The actuator may be rotatable, wherein rotating the actuator may vary the pressure applied to the stopper. Rotation of the actuator is a convenient and compact way for a user to vary the pressure within the fermentation container.

The actuator may be movable to vary the force applied to the stopper by means of a screw thread. The actuator may comprise a screw thread and the valve body may comprise a protrusion about which the screw thread is configured to translate as the actuator is rotated. This provides a predictable and reliable movement of the actuator and, consequently, a predictable and reliable variation of the resistance of the valve and therefore the pressure within the fermentation container.

The valve may be used as a safety valve with any of the fermentation containers or fermentation apparatuses described herein. Alternatively or additionally, the valve may be employed in addition to a safety valve.

In accordance with the present invention, there is also provided a fermentation apparatus comprising:
a fermentation container; and
a cap that is attachable to the fermentation container and is configured to seal the fermentation container when the cap is attached to the fermentation container,
wherein the cap comprises a handle, and
wherein the handle is movable between a first position in which the handle is graspable by a user and a second position in which the cap is prevented from being removed from the fermentation container when the cap is attached to the fermentation container.

The present invention advantageously provides a convenient and elegant way of preventing the cap from being detached from the fermentation container accidentally during fermentation by using the handle as a part of the locking mechanism. This removes the need for additional locking features which simplifies the design.

The handle may be prevented from moving from its first position to its second position until the cap is attached to the fermentation container. This way, the user cannot misuse the locking mechanism, which would risk damaging the apparatus.

At least one of the cap and the fermentation apparatus may comprise an indicator to indicate when the cap has been attached to the fermentation container. This assists the user in alerting him/her when the handle can be moved to its second position to lock the cap. The cap and the fermentation container may comprise corresponding screw threads for attaching the cap to the fermentation container wherein the cap and the fermentation container may each comprise corresponding detents that are configured to abut each other when the cap has been attached to the fermentation container. This is a convenient and effective way of indicating to the user that the cap has been properly attached to the fermentation container.

The handle may be movable from its first position to its second position in a first direction but may be prevented from moving in a second direction that is opposed to the first direction when the cap has been attached to the fermentation container. This prevents the user from misusing the handle or improperly locking the cap to the fermentation container.

The fermentation container may comprise an abutment that is configured to abut the handle if removal of the cap is attempted when the handle is in its second position. In other words, once the handle is in its second position, if the user attempts to remove the cap, the handle of the cap abuts against the abutment of the fermentation container to prevent this from happening. This is a neat and effective way of preventing accidental removal of the cap using the existing handle of the cap.

The fermentation apparatus may further comprise a collector (i.e. a yeast dump as described previously) that is attachable to the fermentation container to collect waste from the fermentation container, wherein the collector may comprise a projection that is configured to engage the handle when the handle is in its second position to prevent the handle from moving to its first position. In other words, the collector is shaped (via the projection) to retain the handle in its second position whilst the collector is being attached to or detached from the fermentation container so that accidental removal of the cap is prevented whilst this process is taking place.

The cap and handle may be used with any of the fermentation containers or fermentation apparatuses described herein.

BRIEF DESCRIPTION OF THE DRAWINGS

The present invention will now be described with reference to the accompanying drawings, in which:

FIG. 27 shows a valve for a fermentation container in assembled form;

FIG. 28 shows an exploded view of the valve of FIG. 27;

FIG. 29 shows the valve of FIG. 27 and FIG. 28 at different pressure settings;

DETAILED DESCRIPTION

Figure 1:
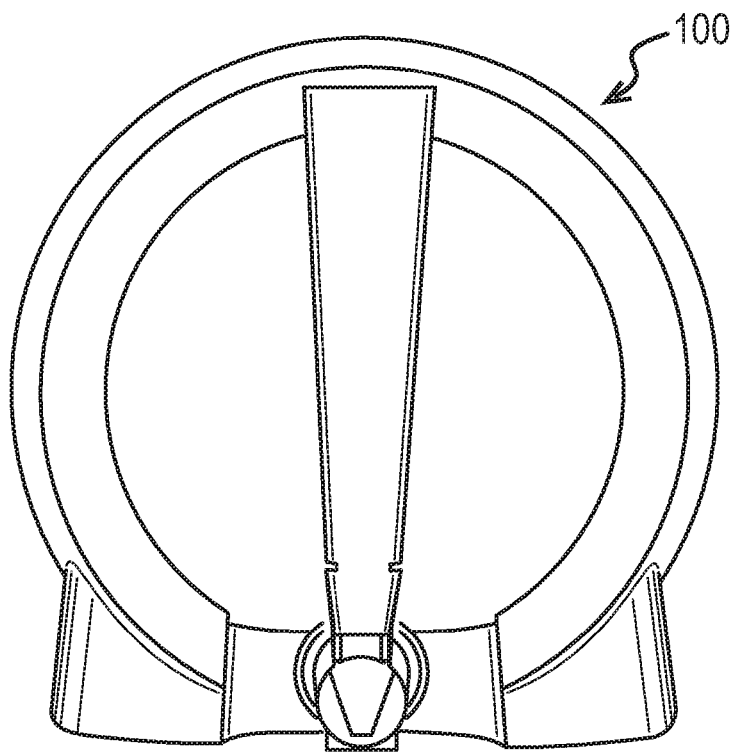
FIG. 1 shows a front view of an apparatus according to the invention.
Figure 2:
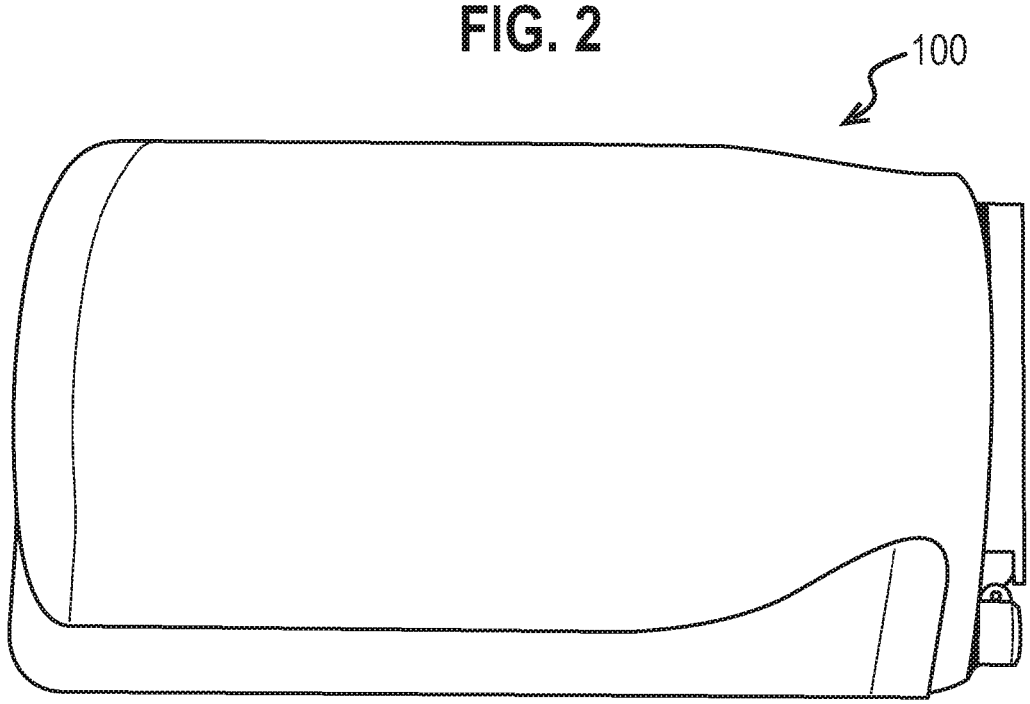
FIG. 2 shows a side view of the apparatus of FIG. 1.

FIGS. 1 and 2 show front and side views, respectively, of an apparatus 100 for fermenting and dispensing a beverage, such as an alcoholic beverage (e.g. beer, cider), that will be described in further detail below with reference to the subsequent figures.

Figure 3:
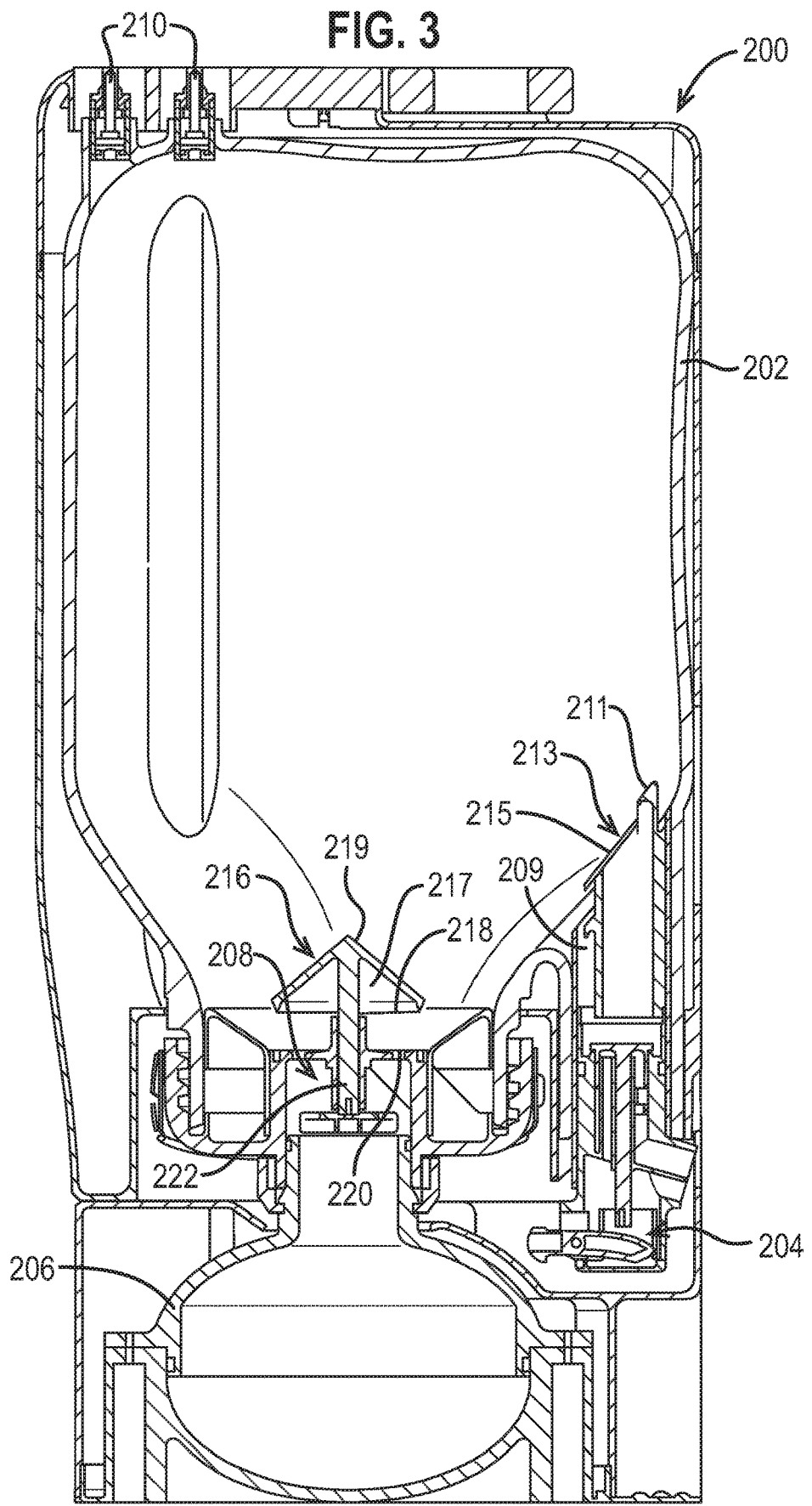
FIG. 3 shows a cross-sectional view of an apparatus according to an embodiment of the invention with a collector attached to a fermentation container.

FIG. 3 shows a cross-sectional view of an apparatus 200 according to an embodiment of the invention. The apparatus 200 comprises a fermentation container 202 for containing and fermenting a beverage (e.g. beer or cider), a tap assembly 204 in fluid communication with the fermentation container 202 for dispensing a beverage from the fermentation container 202, a collector 206 (or "yeast dump") for collecting waste (e.g. yeast) from the fermentation container 202.

Before use, the fermentation container 202 is sterilised. During fermentation, the fermentation ingredients (e.g. yeast, a syrup containing pre-hopped malt extract and water) are poured into the fermentation container 202 and the fermentation container 202 is sealed. The mixture is left to ferment in the fermentation container 202 with the fermentation container vertically upright (i.e. in the orientation shown in FIG. 3) for a suitable amount of time, typically 48 hours. The skilled person will understand how long the fermentation process should be.

In FIG. 3, the collector 206 is shown attached to the fermentation container 202. As will be described in further detail below with reference to FIGS. 5 and 6, the collector 206 is attachable to and detachable from (i.e. removably attached to) the fermentation container 202. As shown in FIG. 3, when the collector 206 is attached to the fermentation container 202, the fermentation container 202 and the collector 206 are in fluid communication via a first outlet 208 so that yeast that settles in the fermentation container 202 during fermentation falls down into the collector 206 as a result of gravity and collects in the collector 206. The fermentation container 202 comprises angled or sloping interior walls that encourage waste, such as yeast, to move or slide down the walls of the fermentation container towards the first outlet where it can drop into the collector. The tap assembly 204 is in fluid communication with the fermentation container 202 via a second outlet 209. The fermentation container also comprises one or more safety valves 210 for expelling excess gas from the fermentation container 202 if the pressure is too high. FIG. 3 shows two safety valves 210 but any suitable number can be used. The safety valves 210 can also be used to inject fresh hops, finings, flavourings (e.g. natural flavourings) or other ingredients into the fermentation container 202 before or during fermentation whilst still maintaining the pressure within the fermentation container 202. Alternatively or additionally, there may be multiple safety valves and/or additional dosing valves for injecting hops, finings, flavourings (e.g. natural flavourings) or other ingredients into the fermentation container 202 before or during fermentation whilst still maintaining the pressure within the fermentation container 202.

Once fermentation is complete, the collector 206 is removed from the fermentation container 202. During fermentation, all of the waste yeast has settled in the collector 206 and therefore the beverage in the fermentation container 202 is free of sediment.

Figure 4:
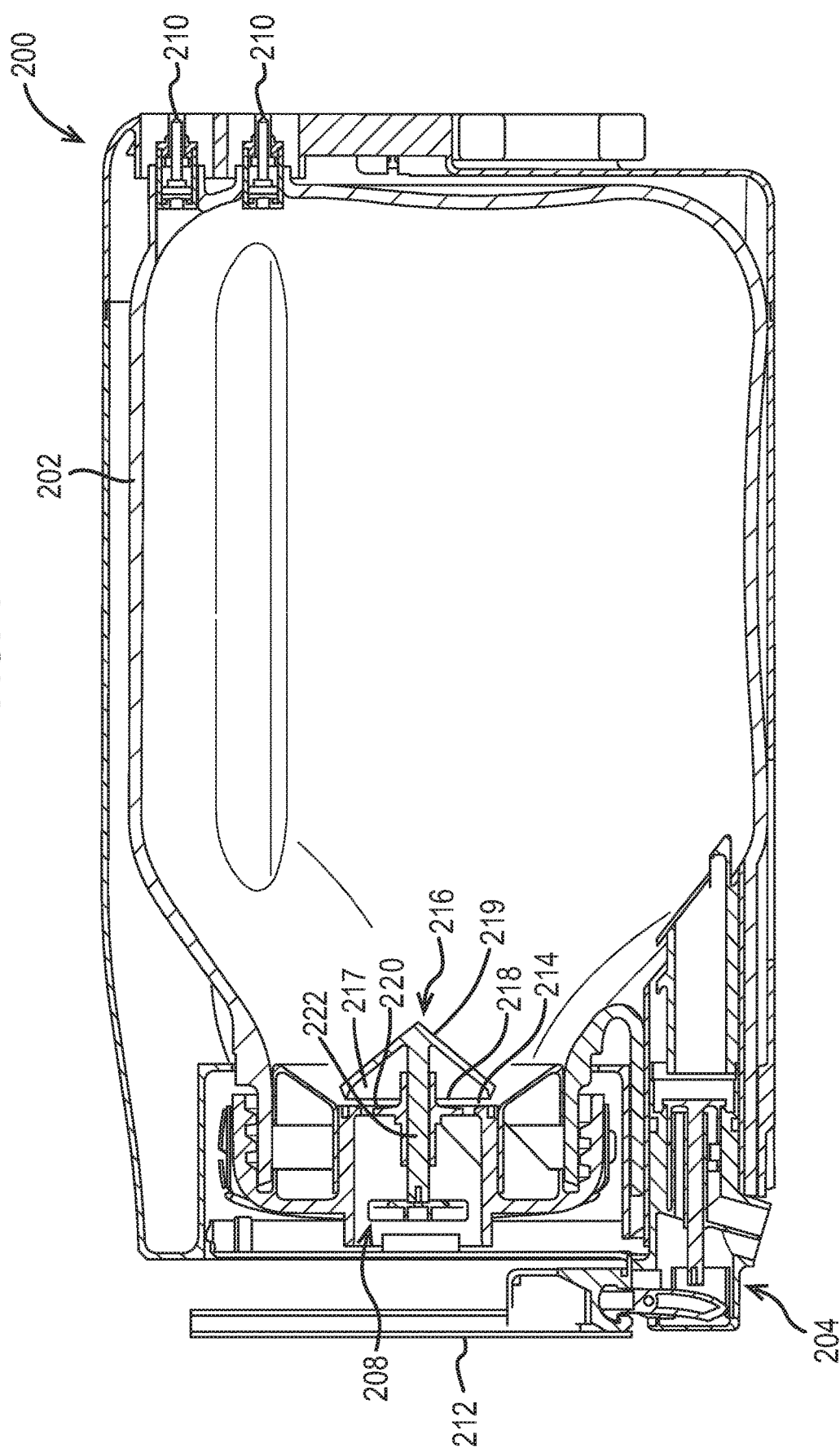
FIG. 4 shows a cross-sectional view of the apparatus of FIG. 3 but with the collector removed and a handle attached to a tap assembly.

FIG. 4 shows the same apparatus 200 as FIG. 3 but with after the connector 206 has been removed. A handle 212 has been attached to the tap assembly to allow a user to actuate the tap assembly 204. When the collector 206 is removed from the fermentation container 202, the first outlet 208 forms a pressure-tight seal 214. Again, it will be described in detail below with reference to FIGS. 5 and 6 how this works. This means that once the fermentation process has been completed, the collector 206 can be removed from the fermentation container 202 whilst maintaining the pressure within the fermentation container 202. Maintaining the pressure within the fermentation container 202 means that the beverage in the fermentation container 202 will last longer before going flat.

Once fermentation is complete, the collector 206 has been removed and the handle 212 has been attached, the apparatus 200 is rotated 90 degrees onto its side (i.e. in the orientation shown in FIG. 4) for carbonation and then dispensing of the beverage. It is possible to position the apparatus 200 vertically during fermentation (i.e. with the safety valves 210 at the top expelling gas upwards and the collector 206 at the bottom collecting downward waste) and horizontally during carbonation and dispensing (i.e. with the tap assembly 204 dispensing beverage downwards) because of the location and orientation of the collector 206, the tap assembly 204 and the safety valves 210. As shown in FIGS. 3 and 4, a tap assembly 204 that is configured to dispense beverage in a direction that is perpendicular to the movement of the collector 206 and the direction that gas is expelled by the safety valves 210 means that the apparatus 200 is well-configured to be positioned vertically during fermentation and horizontally during carbonation and dispensing. This is advantageous because it means that the apparatus 200 is more manoeuvrable into a range of locations for carbonation and dispensing. For example, the apparatus 200 can be positioned upright for fermentation, then the collector 206 can be removed and the apparatus 200 can be placed on a normal domestic refrigerator shelf for carbonation and dispensing, which is desirable because carbonation occurs more quickly in a refrigerator and the beverage is more enjoyable when cold. It would be more difficult to place the apparatus 200 on a refrigerator shelf if it remained vertical at all times. It is a significant advantage of the invention that fermentation, carbonation and dispensing can all be done using the same fermentation container 202. Maintaining the pressure in the fermentation container even when the collector has been removed (and whilst it is being removed) has further benefits. Firstly, it prevents the beverage being spilled whilst the collector is being removed. Secondly, it means that the same vessel can be used for fermentation and carbonation. $CO_2$ is released during the fermentation process and, because a pressure-tight seal is maintained even when the collector is removed, enough $CO_2$ is released, captured and retained within the fermentation container (even after the collector has been removed) that the $CO_2$ that is released during primary fermentation is the same $CO_2$ that then carbonates the beverage. This single-vessel fermentation/carbonation is a significant improvement on past apparatuses and avoids the need to inject extra $CO_2$ for carbonation (e.g. through a valve or by using $CO_2$ cartridges) which could risk depressurising the fermentation container or allowing $O_2$ or other contaminants into the container which could spoil the beverage or cause it to go off.

The tap assembly 204 and the safety valve 210 are located at diagonally opposite corners of the fermentation container 202 when the tap assembly 204 is attached to the fermentation container. In other words, the tap assembly 204 and the safety valve 210 are located on opposite sides of the fermentation container in two dimensions. For example, if the tap assembly 204 is located at the front bottom corner of the fermentation container 202 then the safety valve 210 is located at the rear top corner of the fermentation container 202. Equally, if the tap assembly 204 is located at the rear bottom corner of the fermentation container 202 then the safety valve 210 is located at the front top corner of the fermentation container 202. The skilled person will understand other similar opposing combinations. This has the advantage that no matter whether the apparatus is upright or lying on its side, beverage can be dispensed through the tap assembly and degassing can occur through the safety valve because the tap assembly is located at the bottom and the safety valve is located at the top regardless of whether the apparatus is upright or on its side. This offers significant benefits in terms of flexibility of storage and use.

In the horizontal position shown in FIG. 4, the beverage is carbonated in a refrigerator for a suitable amount of time, typically 24 hours. The skilled person will understand how long the carbonation process should be. Once carbonation is complete, the fermented and carbonated beverage can be tapped using the tap assembly 204 by pulling the handle 212. It will be explained in further detail with reference to FIGS. 7 to 9 how this occurs.

Figure 5:
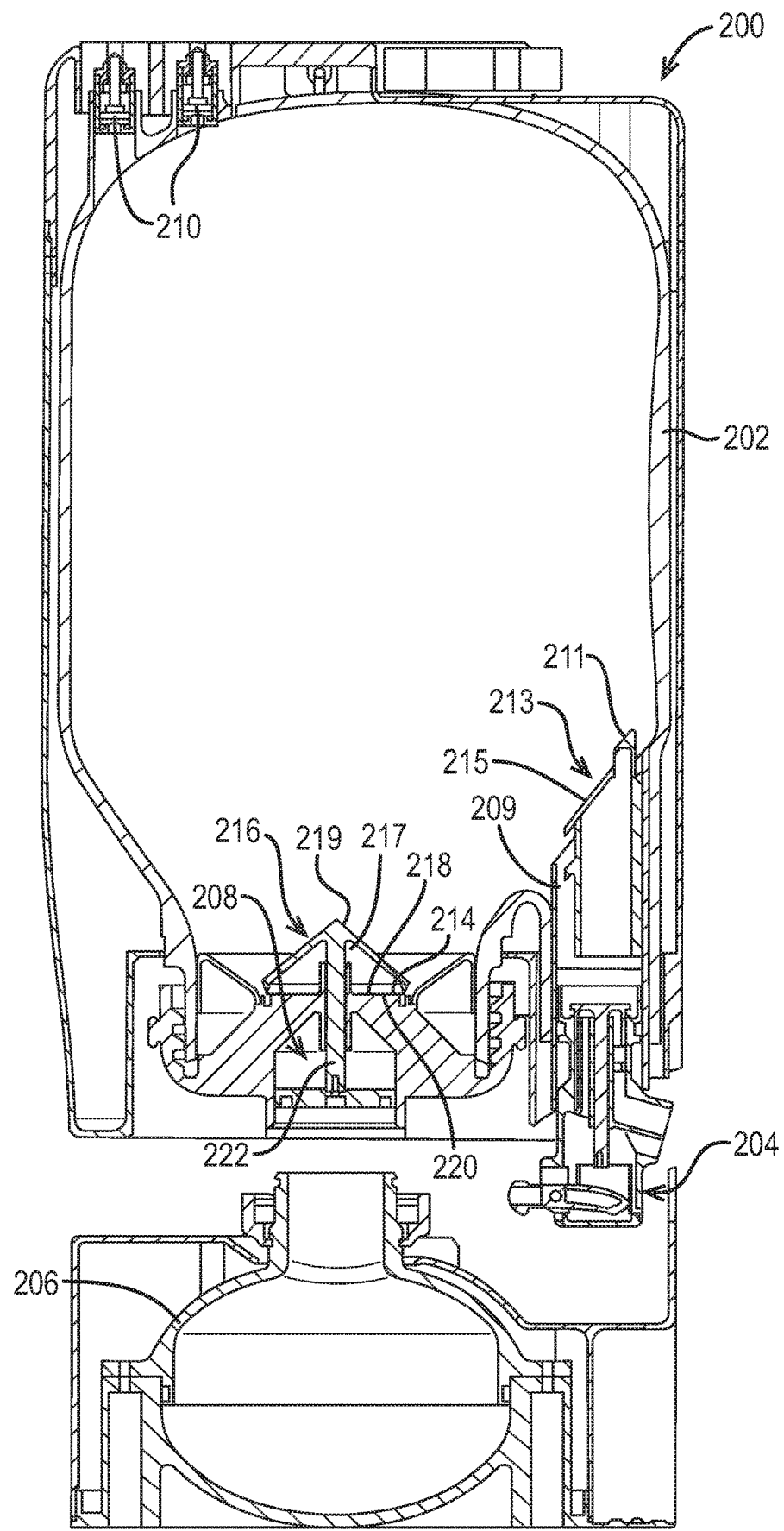
FIG. 5 shows a cross-sectional view of the apparatus of FIGS. 3 and 4 with the collector present but not attached to the fermentation container.
Figure 6:
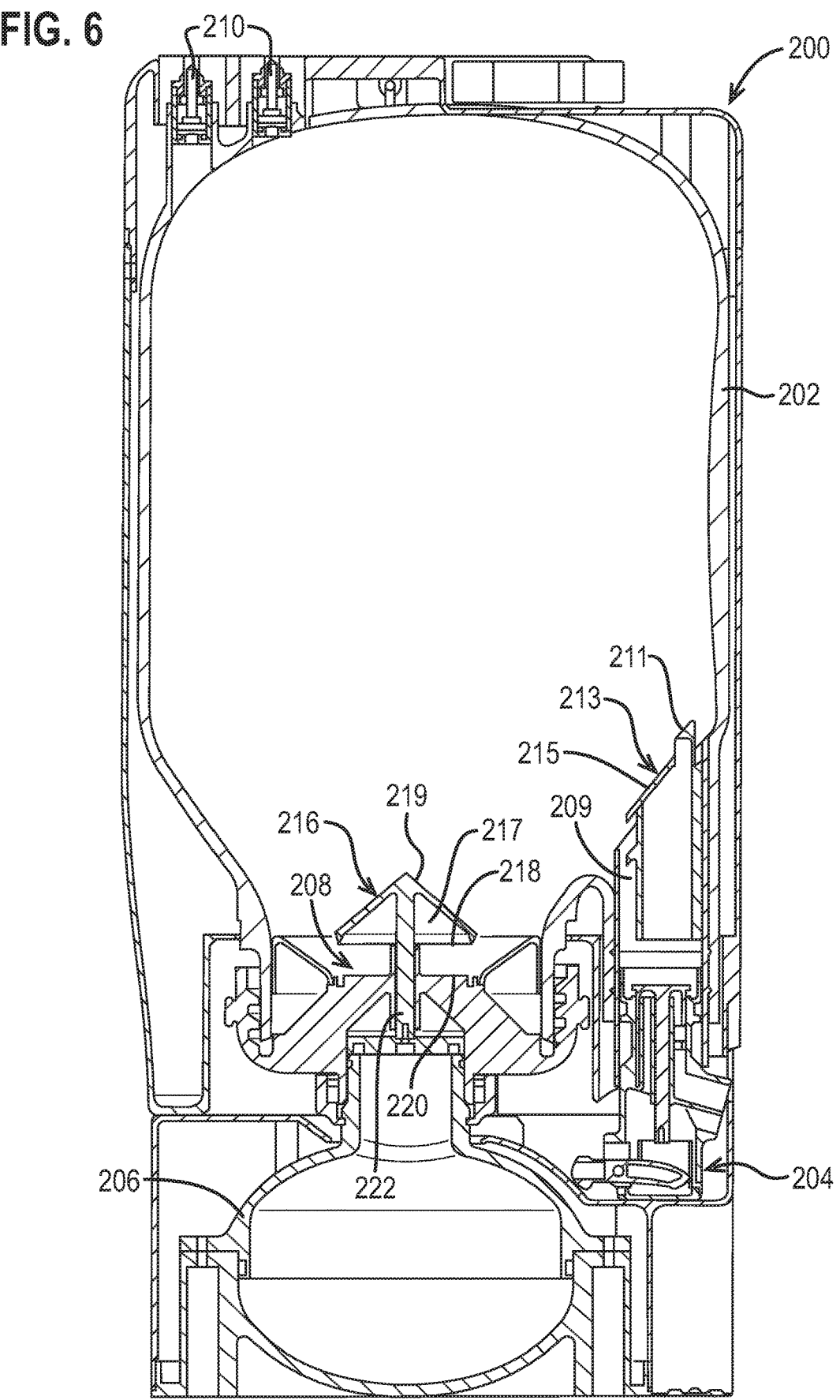
FIG. 6 shows a cross-sectional view of the apparatus of FIG. 5 with the collector attached to the fermentation container.

FIGS. 5 and 6 show in detail how the collector 206 is attached to and detached from the fermentation container 202, with FIG. 5 showing the collector 206 detached from the fermentation container 202 and FIG. 6 showing the collector 206 attached to the fermentation container 202. The same labels are used in FIGS. 5 and 6 as in FIGS. 3 and 4 for corresponding features.

As shown in FIG. 5, the first outlet 208 of the fermentation container 202 forms a pressure-tight seal 214 when the collector 206 is detached from the fermentation container 202. To form the pressure-tight seal 214, the first outlet 208 is moveable from a first position (shown in FIG. 5) to a second position (shown in FIG. 6) by attaching the collector 206 to the fermentation container 202. Conversely, the first outlet 208 is moveable from its second position to its first position by detaching the collector 206 from the fermentation container 202. In other words, attaching the collector 206 to the fermentation container 202 automatically establishes the fluid communication between the fermentation container 202 and the collector 206 via the outlet 208 (FIG. 6). Similarly, removing the collector 206 from the fermentation container 202 automatically actuates the pressure-tight seal 214 (FIG. 5) meaning that the pressure is automatically maintained within the fermentation container 202. This results in a very convenient and user-friendly arrangement that ensures that the beverage does not go flat quickly.

As shown in FIGS. 5 and 6, the first outlet 208 comprises a plug 216 that is moveable from a first position in which the first outlet 208 is in its first position (FIG. 5) and a second position in which the first outlet 208 is in its second position (FIG. 6). In the second position, the fermentation container 202 and the collector 206 are in fluid communication via the first outlet 208. In the first position, the pressure-tight seal 214 is established thereby sealing the fermentation container 202.

The plug 216 moves inwardly by sliding into the fermentation container 202 when the plug 216 is moved from its first position to its second position. In particular, when the collector 206 is pushed onto the fermentation container 202, it abuts the plug 216 to move it from its first position to its second position to open the first outlet 208 and establish fluid communication between the fermentation container 202 and the collector 206. The plug is biased towards its first position by pressure within the fermentation container.

The plug 216 comprises a body portion 217 having a first surface 218 that is a planar surface that is configured to sealingly engage a corresponding surface 220 on an interior surface of the fermentation container 202 to seal the fermentation container 202 when the plug 216 is in its first position. The body portion 217 of the plug also comprises a second surface 219 that opposes (i.e. is on the opposite face of) the first surface 218. The second surface 219 is cone-shaped (or substantially cone-shaped) with a central tip and a sloped surface extending from the central tip to the edge of the body portion 217. This cone shape means that sediment (e.g. yeast) will slide off the top of the body portion 217 of the plug 216 to the bottom of the fermentation container 202 from where it can drop into the collector 206 through the first outlet 208. The planar surface 218 (i.e. the first surface) of the body portion 217 is the proximal surface of the body portion 217 i.e. the surface that faces away from the centre of the fermentation container 202. The cone-shaped surface 219 (i.e. the second surface) is the distal surface of the body portion 217 i.e. the surface that faces towards the centre of the fermentation container 202. The body portion 217 of the plug 218 is circular or substantially circular in cross-section. The plug 216 also comprises an elongate stem 222 that extends from the planar surface 218 and is in a plane perpendicular to the planar surface 218 of the body portion 217. The elongate stem 222 is configured to slide within a corresponding channel in the fermentation container 202 as the plug 216 moves between its first and second positions. This plug arrangement provides a user-friendly and reliable means for attaching and detaching the collector 206 whilst maintaining the pressure within the fermentation container. There are minimal moving parts meaning that maintenance is simple and the mechanism does not wear, and the combination of the surfaces on the plug and the interior of the fermentation container provides a reliable seal. In the embodiment shown in the Figures, with the combination of the elongate stem 222 and the cone-shaped body portion 217, the plug 216 can take the form of an "umbrella" shape, although this is not essential.

Figure 7:
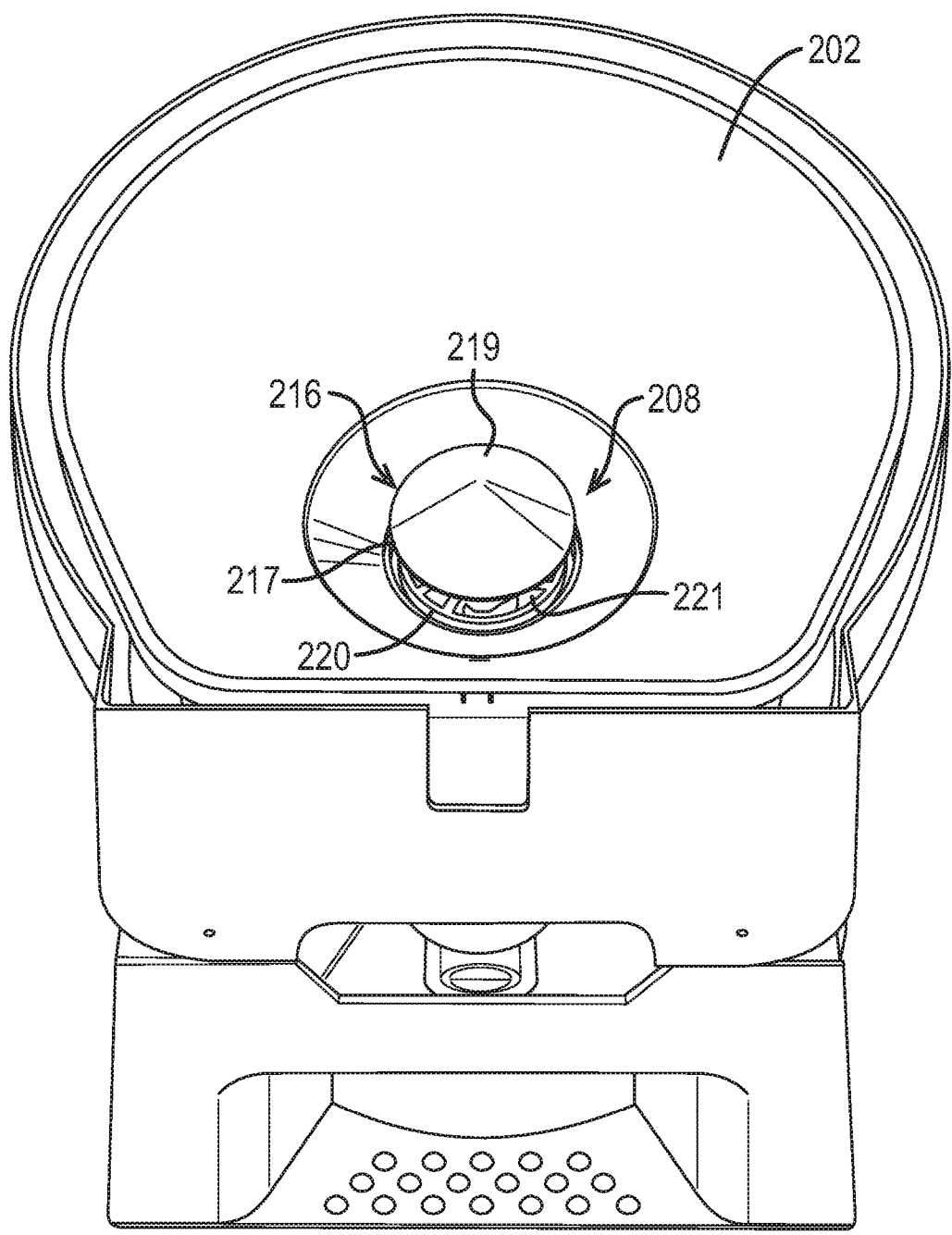
FIG. 7 shows an interior view of a fermentation container according to an embodiment of the invention.

FIG. 7 shows an interior view of the fermentation container 202 with the first outlet 208 and the plug 216 in their second position. It can be seen that there is a gap 221 to allow the passage of fluid through the first outlet 208 when the first outlet 208 and the plug 216 are in their second position. This gap 221 would be closed when the first outlet 208 and the plug 216 are in their first position to establish a pressure-tight seal. The "umbrella" shape of the plug 216 can be seen clearly in FIG. 7

As shown in FIG. 6, when the collector 206 is attached to the fermentation container 202, the collector 206 encloses the tap assembly 204. In this way, the collector 206 prevents actuation of the tap assembly 204 when the collector 206 is attached to the fermentation container 202. The collector 206 may be configured to abut the tap assembly 204 when the collector is in its first position, although this is not essential. By enclosing the tap assembly 204 or otherwise restricting access to the tap assembly 204, the collector 206 prevents accidental actuation of the tap assembly 204 during the fermentation process.

The tap assembly 204 is attachable to the fermentation container 202 by a resilient fit, a snap-fit or an interference fit. The handle 212 is attachable to the tap assembly magnetically, meaning that it can be easily but securely attached and detached.

The tap assembly comprises a hood 213 for preventing sediment (e.g. yeast) from blocking the tap assembly 213. It can be seen that the hood 213 comprises a barrier portion 211 configured to block sediment from dropping into the tap assembly 213 and an angled or sloped surface 215 extending from the barrier portion 211 that is configured to guide sediment (e.g. yeast) away from the tap assembly 204 (i.e. the sediment slides away towards the bottom of the fermentation container 202 and the collector 206 under the force of gravity). In this way, the hood 213 prevents the beverage from being spoilt and prevents the tap assembly 204 from becoming blocked, thereby ensuring reliable dispensing of the beverage.

Figure 8:
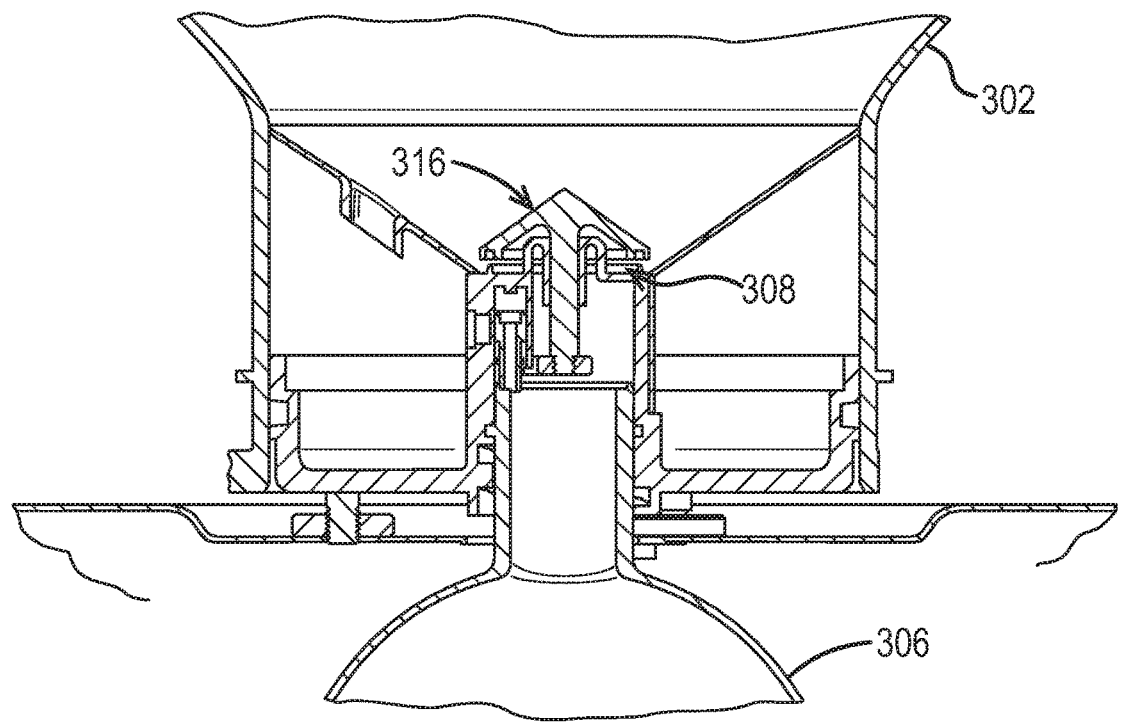
FIG. 8 shows a cross-sectional view of a further embodiment of the invention with the collector attached to the fermentation container.
Figure 9:
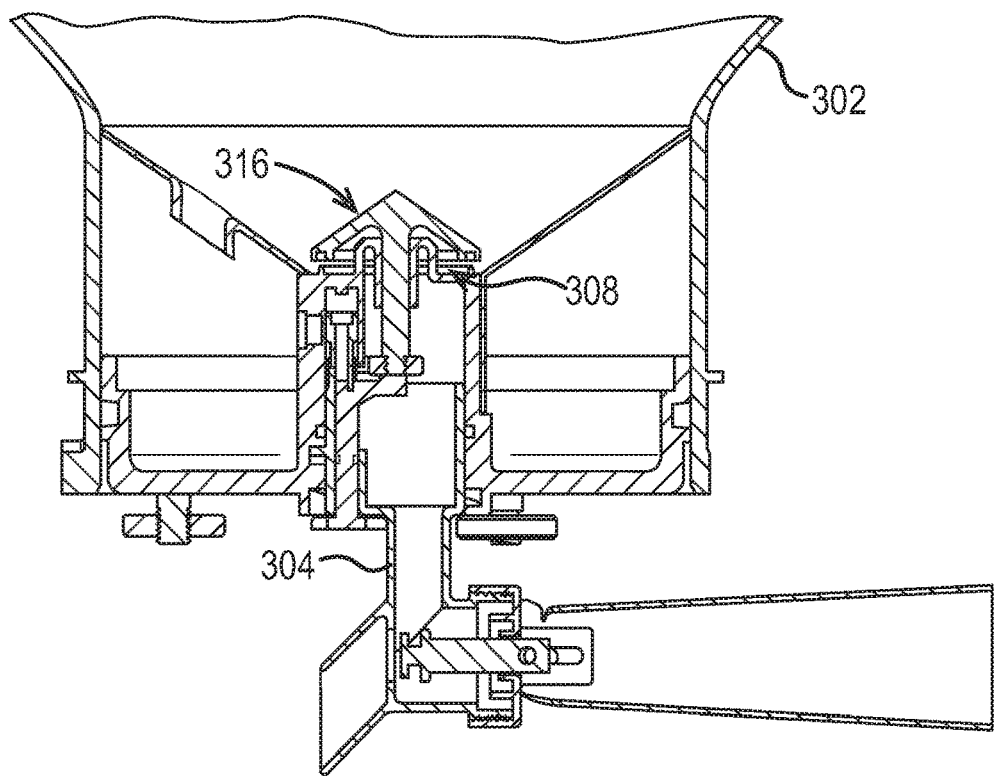
FIG. 9 shows a cross-sectional view of the embodiment of FIG. 7 with the tap assembly attached to the fermentation container.

FIGS. 8 and 9 show an alternative embodiment wherein the collector 306 and the tap assembly 304 are both attachable to the fermentation container 302 via the first outlet 308. The tap assembly 304 is attachable to the fermentation container 302 at the first outlet 308 when the collector 306 is not attached to the fermentation container 302 to allow fluid communication between the fermentation container 302 and the tap assembly 304 via the first outlet 308. The first outlet 308 again comprises a plug 316 and the first outlet 308 and the plug 316 behave in the same way as the first outlet 208 and plug 216 described above with reference to FIGS. 3 to 6, but the first outlet 308 and the plug 316 an be moved between their first and second positions by either the collector 306 or the tap assembly 304. What this means is that the tap assembly and the collector can be interchangeably attached to and detached from the fermentation container, and the fact that the pressure-tight seal is automatically maintained when neither the tap assembly nor the collector is attached to the fermentation container means that pressure can be maintained within the fermentation container and contamination can be prevented.

Figure 10:
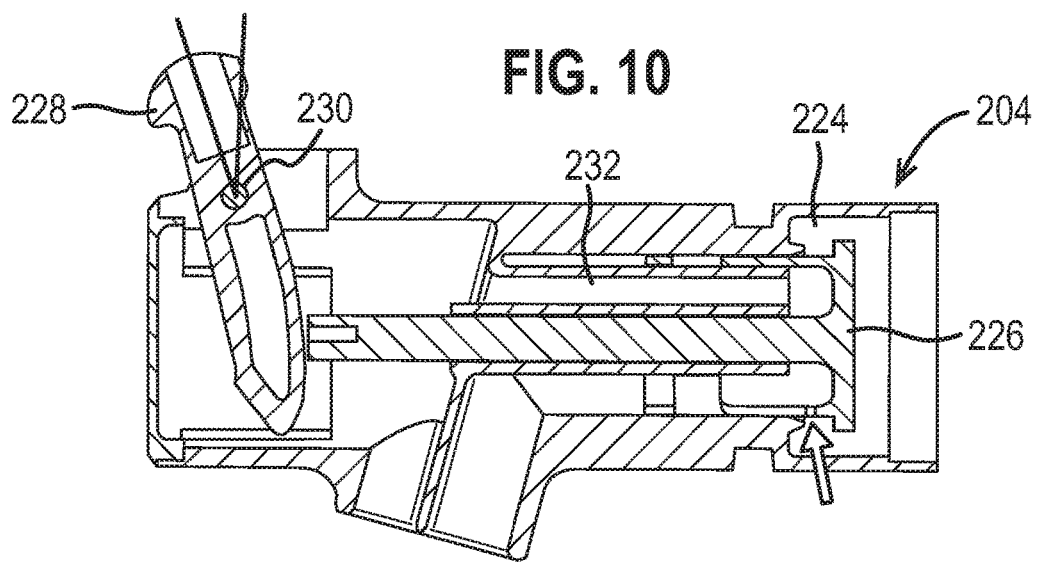
FIG. 10 shows a cross-sectional view of part of a tap assembly according to an embodiment of the invention.
Figure 11:
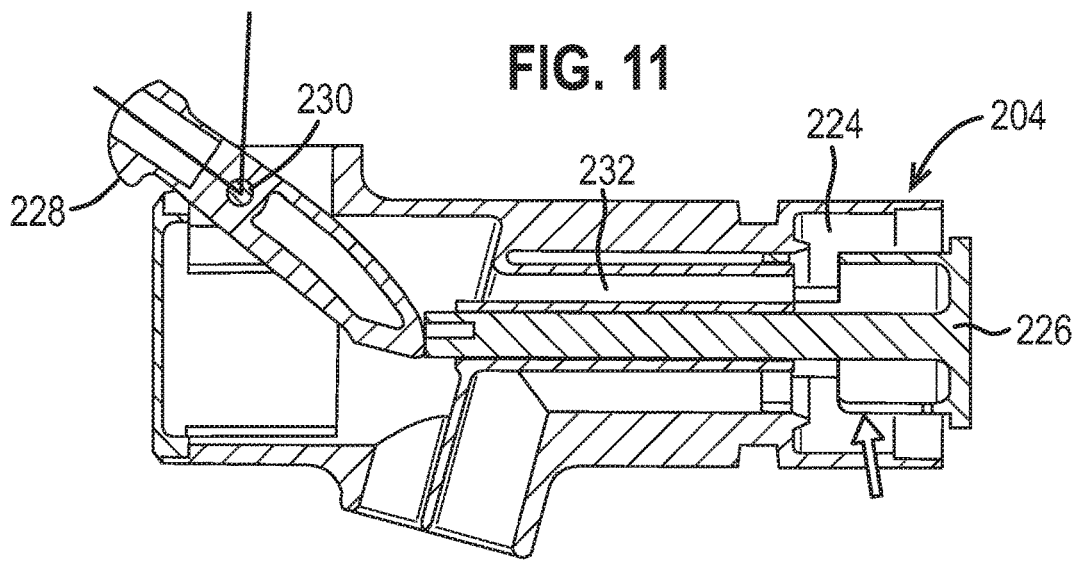
FIG. 11 shows another cross-sectional view of the assembly of FIG. 10 in a different position.

FIGS. 10 and 11 show in more detail part of the tap assembly 204 of the apparatus 200 described above and shown in FIGS. 3 to 6. Equally, FIGS. 10 and 11 show a tap assembly configuration that is used in the tap assembly 304 described above and shown in FIGS. 8 and 9. As shown in FIGS. 10 and 11, the tap assembly 204 comprises an aperture 224 for allowing passage of the beverage therethrough and a moveable component 226 which takes the form of a plug. The moveable component 226 is shown in more detail in FIG. 12. The moveable component 226 is moveable between a first position (FIG. 10) in which the moveable component blocks the aperture 224 to a plurality of second positions in which the moveable component 226 only partially blocks the aperture 224 or does not block the aperture 224 (FIG. 11). As described previously, it is challenging maintaining a high pressure for well-carbonated beer whilst ensuring a predictable and desirable flow rate. The moveable component 226 of the tap assembly 204 can be moved to a plurality of positions covering the aperture 226 to differing degrees (preferably continuously to allow an infinite number of positions, although discreet positions could alternatively be provided e.g. using a ratchet mechanism) to control the flow rate through the aperture 226. The provision of a tap assembly 204 having a moveable component 226 that allows a user to control the proportion of the aperture 224 that is left open for beverage to pass therethrough means that the user can easily control the flow rate depending on how high the pressure is within the fermentation container 202. If the pressure is high (e.g. when few tappings have taken place), a small aperture size can be chosen so that the flow rate is restrained. If the pressure is lower (e.g. after more tappings), a larger aperture can be chosen to provide a sufficient flow. This means that the pressure within the fermentation container 202 can be kept high to begin with, resulting in well-carbonated beverage for longer.

There is also an actuator 228, which takes the form of a rotatable arm, for moving the moveable component 226. The actuator 228 is configured to abut the moveable component 226 to move the moveable component 226. There is also a pivot 230 about which the actuator 228 is configured to rotate. The tap assembly 204 also has a channel 232 in which the moveable component 226 slides when moving to alter the proportion of the aperture 224 that is blocked. The tap assembly 204 may further comprise a biasing means (not shown), such as a spring, configured to bias the moveable component 226 towards its first position (i.e. where the aperture 224 is completely blocked). Biasing the moveable component 226 in this way ensures that beverage does not leak accidentally. The moveable component 226 is configured to slide (i.e. translate, or move in a linear direction e.g. within a channel) between its first and second positions. In other words, rotational movement of the actuator 228 is converted into linear movement of the moveable component 226.

The tap assembly further comprises a handle (as described previously but not shown in FIGS. 10 and 11) that is removably attachable to the actuator 228 e.g. using magnets. Such a rotational handle is compact and easy to use.

The components of the apparatuses and tap assemblies described herein according to the invention are generally made out of plastic, and can therefore be cleaned and sterilised easily. This also means that parts can be machined precisely e.g. by injection moulding. However, the skilled person will appreciate that some or all parts can equally be made from other suitable materials. For example, the handle of the tap assembly is generally constructed from metal and, as described, can be attachable to the tap assembly using magnets. Equally, springs in the apparatus (e.g. the biasing means in the tap assembly or springs in one or more of the valves described herein) may be constructed from metal. Certain decorative elements may also be constructed from metal.

In accordance with another aspect of the invention, there is also provided a package containing ingredients for brewing an alcoholic beverage. Significantly and advantageously, the package is shaped and sized so that it can fit through a standard domestic letterbox.

The package contains ingredients for brewing beer in the apparatus 200 of the invention (including in the alternative arrangement shown in FIGS. 8 and 9), such as yeast and syrup, as well as a steriliser for sterilising the apparatus. The package is substantially cuboidal in shape. A maximum diameter of the package along a first axis may be no more than 50 mm (or approximately 50 mm) and a maximum diameter of the package along a second axis that is perpendicular or substantially perpendicular to the first axis may be no more than 350 mm (or approximately 350 mm). A maximum diameter of the package along a first axis may be no more than 50 mm (or approximately 50 mm) and a maximum diameter of the package along a second axis that is perpendicular or substantially perpendicular to the first axis may be no more than 350 mm (or approximately 350 mm). A maximum diameter of the package along a first axis may be no more than 40 mm (or approximately 40 mm) and a maximum diameter of the package along a second axis that is perpendicular or substantially perpendicular to the first axis may be no more than 300 mm (or approximately 300 mm). A maximum diameter of the package along a first axis may be no more than 35 mm (or approximately 35 mm) and a maximum diameter of the package along a second axis that is perpendicular or substantially perpendicular to the first axis may be no more than 250 mm (or approximately 250 mm). A maximum diameter of the package along a first axis may be no more than 30 mm (or approximately 30 mm) and a maximum diameter of the package along a second axis that is perpendicular or substantially perpendicular to the first axis may be no more than 250 mm (or approximately 250 mm). A maximum diameter of the package along a first axis may be no more than 25 mm (or approximately 25 mm) and a maximum diameter of the package along a second axis that is perpendicular or substantially perpendicular to the first axis may be no more than 250 mm (or approximately 250 mm). In real terms, thinking about the height and width of a standard letterbox, "height" may be the maximum diameter along the first axis and "width" may be the maximum diameter along the second axis that is perpendicular to the first axis. It will be understood that the package will also have a "length" i.e. a diameter along a third axis that is perpendicular or substantially perpendicular to both the first and second axes. However, the skilled person will understand that as long as at least two of these three maximum diameters are sufficiently small (height and width in the definitions above, and when envisaging a real-life letterbox), then the package will fit through a standard letterbox. The diameter along the third axis (i.e. the length) may be greater than the maximum diameters along the first and second axes (i.e. the height and width), although clearly this does not necessarily have to be the case.

In this way, the package can fit through a standard letterbox.

The package of the invention is intended to contain refill ingredients for the apparatus of the invention, as well as a steriliser. The package is compact and intended for delivery through a standard domestic letterbox. This means that the consumer does not need to transport the beverage home from a shop and also does not need to be present to accept a home delivery, which would conventionally have been too large to fit through a letterbox. The package of the invention also has additional benefits for the consumer because duty would not need to be paid on the package, reducing cost. The package of the invention also has significant environmental benefits because it reduces the packaging needed for enjoyment of beverages, such as beer, at home. For example, a considerable amount of plastic is conventionally used in packaging for beverages (e.g. plastic holding cans together).

The package and apparatus of the invention can be provided as a kit.

Figure 13:
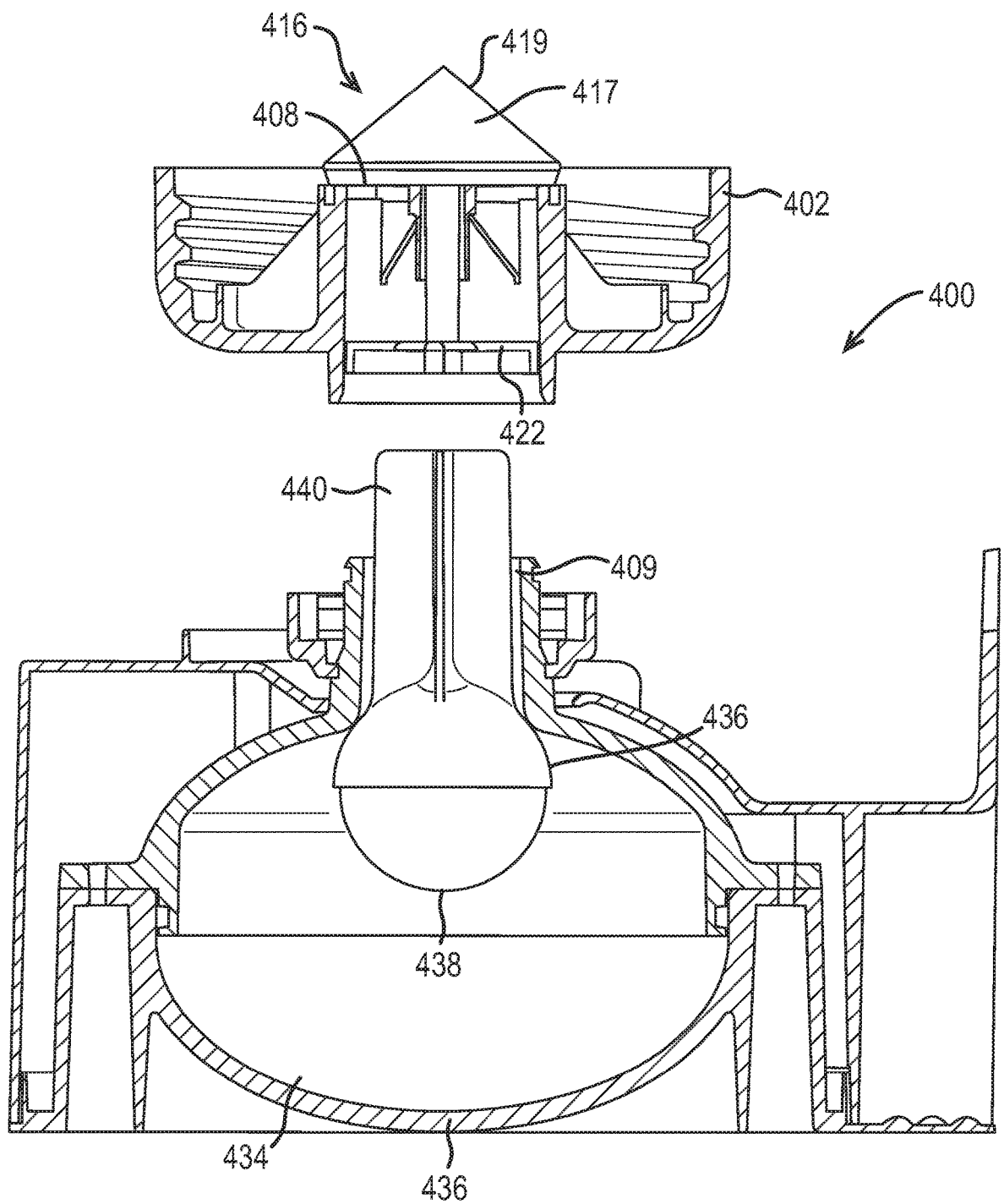
FIG. 13 shows a cross sectional view of another apparatus according to the invention in a first configuration.
Figure 14:
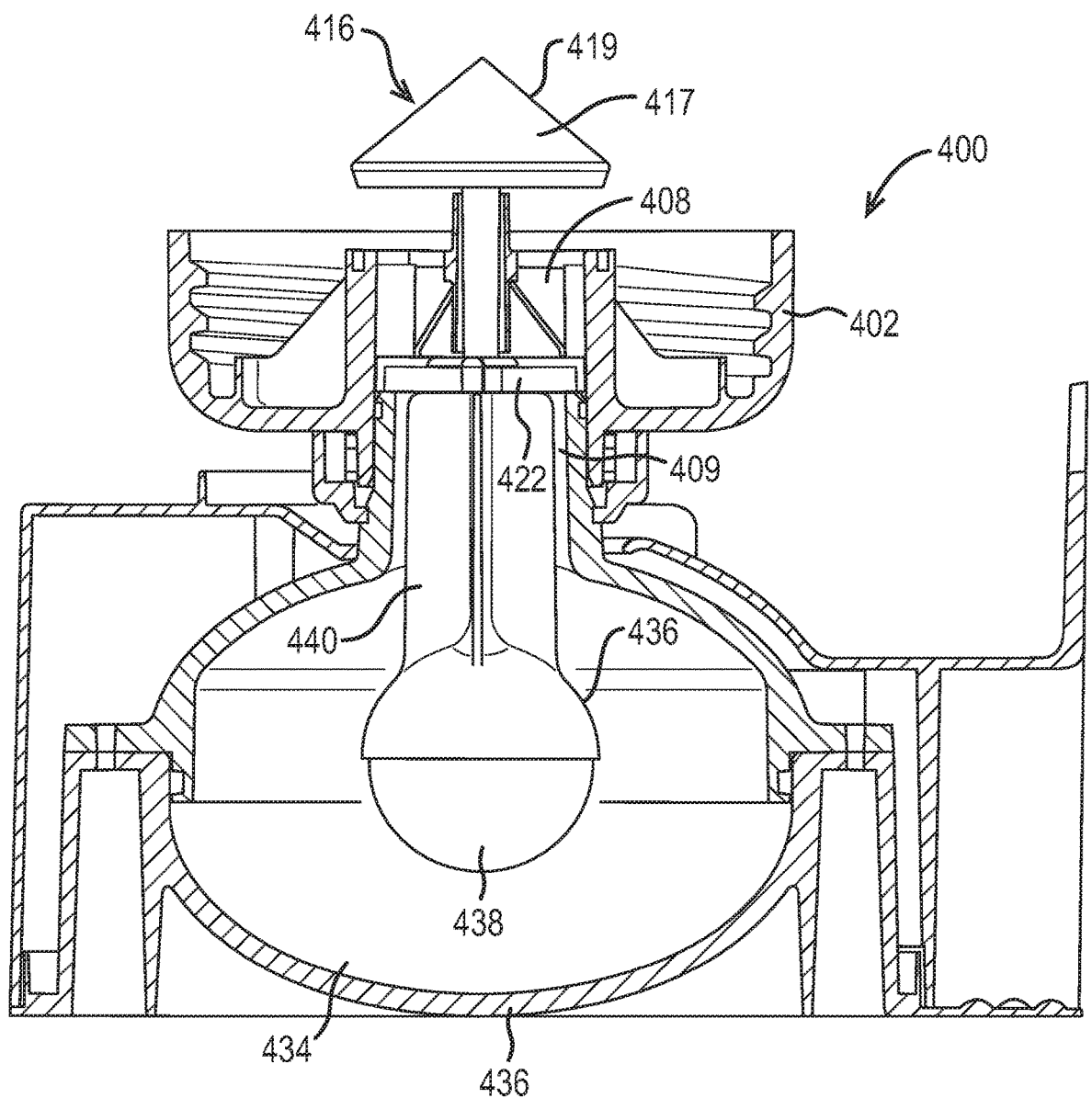
FIG. 14 shows a cross sectional view of the apparatus of FIG. 13 in a second configuration.

FIGS. 13 and 14 show another apparatus 400 according to an embodiment of the invention. The apparatus 400 may have any or all of the features and modes of operation of any of the apparatuses (e.g. apparatuses 200, 300) described previously and the skilled person will understand that any of the features of the various embodiments may be combined in any suitable manner.

The apparatus 400 comprises a fermentation container 402 (shown in part) for containing and fermenting a beverage (e.g. beer or cider) and a collector 406 (or "yeast dump")

for collecting waste (e.g. yeast) from the fermentation container 402. Of course, the apparatus may also comprise any of the tap assemblies described herein (not shown).

As described previously, before use, the fermentation container 402 is sterilised. During fermentation, the fermentation ingredients (e.g. yeast, a syrup containing pre-hopped malt extract and water) are poured into the fermentation container 402 and the fermentation container 402 is sealed. The mixture is left to ferment in the fermentation container 402 with the fermentation container vertically upright (i.e. in the orientation shown in FIGS. 13 and 14) for a suitable amount of time, typically 48 hours. The skilled person will understand how long the fermentation process should be.

In FIG. 14, the collector 406 is shown attached to the fermentation container 402. As will be described in further detail below, the collector 406 is attachable to and detachable from (i.e. removably attached to) the fermentation container 402. As shown in FIG. 14, when the collector 406 is attached to the fermentation container 402, the fermentation container 402 and the collector 406 are in fluid communication via an outlet 408 of the fermentation container 402 and an inlet 409 of the collector so that yeast that settles in the fermentation container 402 during fermentation falls down into the collector 406 as a result of gravity and collects in the collector 406. The fermentation container 402 comprises angled or sloping interior walls that encourage waste, such as yeast, to move or slide down the walls of the fermentation container towards the first outlet where it can drop into the collector. The fermentation container 402 also comprises one or more safety valves (not shown) for expelling excess gas from the fermentation container 402 if the pressure is too high. Any suitable number of safety valves can be used. The safety valves can also be used to inject fresh hops, finings, flavourings (e.g. natural flavourings) or other ingredients into the fermentation container 402 before or during fermentation whilst still maintaining the pressure within the fermentation container 402. Alternatively, additional valves can be provided for injecting these or other ingredients.

Once fermentation is complete, the collector 406 is removed from the fermentation container 402. During fermentation, all of the waste yeast has settled in the collector 406 and therefore the beverage in the fermentation container 402 is free of sediment.

FIGS. 13 and 14 show in detail how the collector 406 is attached to and detached from the fermentation container 402, with FIG. 13 showing the collector 406 detached from the fermentation container 402 and FIG. 14 showing the collector 406 attached to the fermentation container 402.

As shown in FIGS. 13 and 14, the outlet 408 of the fermentation container 402 is movable between first and second configurations in the same way as described previously for outlets 208 and 308. The outlet 408 comprises a plug 416 that is movable between a first (FIG. 13) position and a second (FIG. 14) position in the same way as plugs 216 and 316 described previously. The plug 416 has a body portion 417 and first and second surfaces 418, 419 like plugs 216 and 316 described previously. Like plugs 216 and 316, plug 416 is "umbrella" shaped by virtue of a sloped second surface 419, although this is not essential.

The collector 406 comprises an inlet 409 that can be moved between a first configuration (FIG. 13) in which the inlet 409 is sealed and waste is prevented from entering a chamber 434 of the collector 406, and a second configuration (FIG. 14) in which the inlet 409 is unsealed and waste is allowed to enter the chamber 434. In this way, once the waste has been gathered in the collector 406 during the fermentation process, the collector 406 can be sealed off to prevent any waste (e.g. waste liquid and/or sediment) from spilling from the collector 406.

The inlet 409 comprises a stopper 436 that is movable between a first position (FIG. 13) in which the inlet 409 is in its first configuration and a second position (FIG. 14) in which the inlet 409 is in its second configuration. The stopper 436 is movable in a direction inwardly towards the centre of the chamber 434 when moving from its first position to its second position and the stopper 436 is movable in a direction outwardly away from the centre of the chamber 434 when moving from its second position to its first position. This provides a simple and convenient arrangement for sealing and unsealing the collector 406 at the inlet 409.

The stopper 436 is biased towards its first position by pressure within the collector 406. The stopper 436 also comprises a float 438 that is configured to float on waste collected within the chamber 434. This is advantageous because it allows the stopper 436 to float on the waste (e.g. waste liquid and/or sediment) that has gathered in the collector 406 during the fermentation process and rise to seal the inlet 409 automatically. The float 438 may be hollow or substantially hollow or at least as hollow as necessary to allow the stopper 436 to float. In the embodiment shown in FIGS. 13 and 14, the float is spherical but the skilled person will understand that any suitable shape could be used.

The stopper may be configured to gradually release pressure from the collector when the inlet is in its first position to prevent the collector from becoming overpressurised if carbonated beverage remains in the collector. This can be achieved by shaping the stopper to gradually release pressure or by using the surface properties (e.g. materials) of the stopper, for example.

The stopper 436 further comprises a stem 440 extending from the float 438 at least partially through the inlet 409. The stem 440 is shaped to permit fluid flow therethrough. In the figures, the stem 440 has a cross-shaped cross-sectional shape. The skilled person will understand that other shapes (e.g. Y-shaped, cylindrical) could equally be used. These shapes mean that the stopper 436 can permit fluid flow through the inlet 409 when the float 438 is not sealing the inlet 409 (i.e. when the stopper 436 is not in its first (sealed) position.

As shown in FIGS. 13 and 14, the inlet 409 is configured to be in its first configuration when the fermentation container 402 and the collector 406 are not attached (FIG. 13) and the inlet 409 is configured to be in its second configuration when the fermentation container 402 and the collector 406 are attached (FIG. 14).

This provides an advantageous arrangement in which attaching the fermentation container 402 and the collector 406 automatically results in the collector inlet 409 moving from its first configuration to its second configuration to permit waste from the fermentation container 402 to enter the collector chamber 434. Similarly, detaching the fermentation container 402 and the collector 406 automatically results in the collector inlet 409 moving from its second configuration to its first configuration to seal the collector chamber 434 and prevent spillage of waste from the collector 406.

The plug 416 of the fermentation container outlet 408 is configured to abut the stopper 436 of the collector inlet 409 to move the stopper between its first and second positions. This abutment also moves the plug 416 between its first and second positions. In other words, when the fermentation container 402 and the collector 406 are attached, the plug 416 of the fermentation container 402 and the stopper 436 of the collector 406 abut each other meaning that both the plug 416 and the stopper 436 automatically move to their second positions to permit waste from the fermentation container 402 to pass through the fermentation container outlet 408 and the collector inlet 409 to gather in the collector 402. Similarly, when the fermentation container 402 and the collector 406 are not attached (i.e. detached), the plug 416 of the fermentation container 402 and the stopper 436 of the collector 406 no longer abut each other meaning that both the plug 416 and the stopper 436 automatically move to their first positions to seal the fermentation container 402 (to maintain pressure) and seal the collector 406 (to prevent spillage of waste). This automatic movement of the plug 416 and stopper 436 is highly advantageous and reduced the amount of user input required. The plug 416 is biased towards its first position by pressure within the fermentation container 402.

In the embodiment shown in FIGS. 13 and 14, the plug 416 comprise an abutment portion 422 (which is analogous to the stem 222, 322) that is shaped to permit fluid flow therethrough. In the figures, the abutment portion 422 has a cross-shaped cross-sectional shape and is configured to abut the stopper 436. Having an abutment portion 422 of the plug 416 and a stem 440 of the stopper 436 that are the same shape (e.g. cross-shaped) improves the engagement or abutment between the plug 416 and the stopper 436. The skilled person will understand that other shapes (e.g. Y-shaped, cylindrical) could equally be used. These shapes of plug 416 and stopper 436 permit fluid flow through the fermentation container outlet 408 and the collector inlet 409 when the outlet and inlet are not sealed (i.e. in their second configurations).

Figure 15:
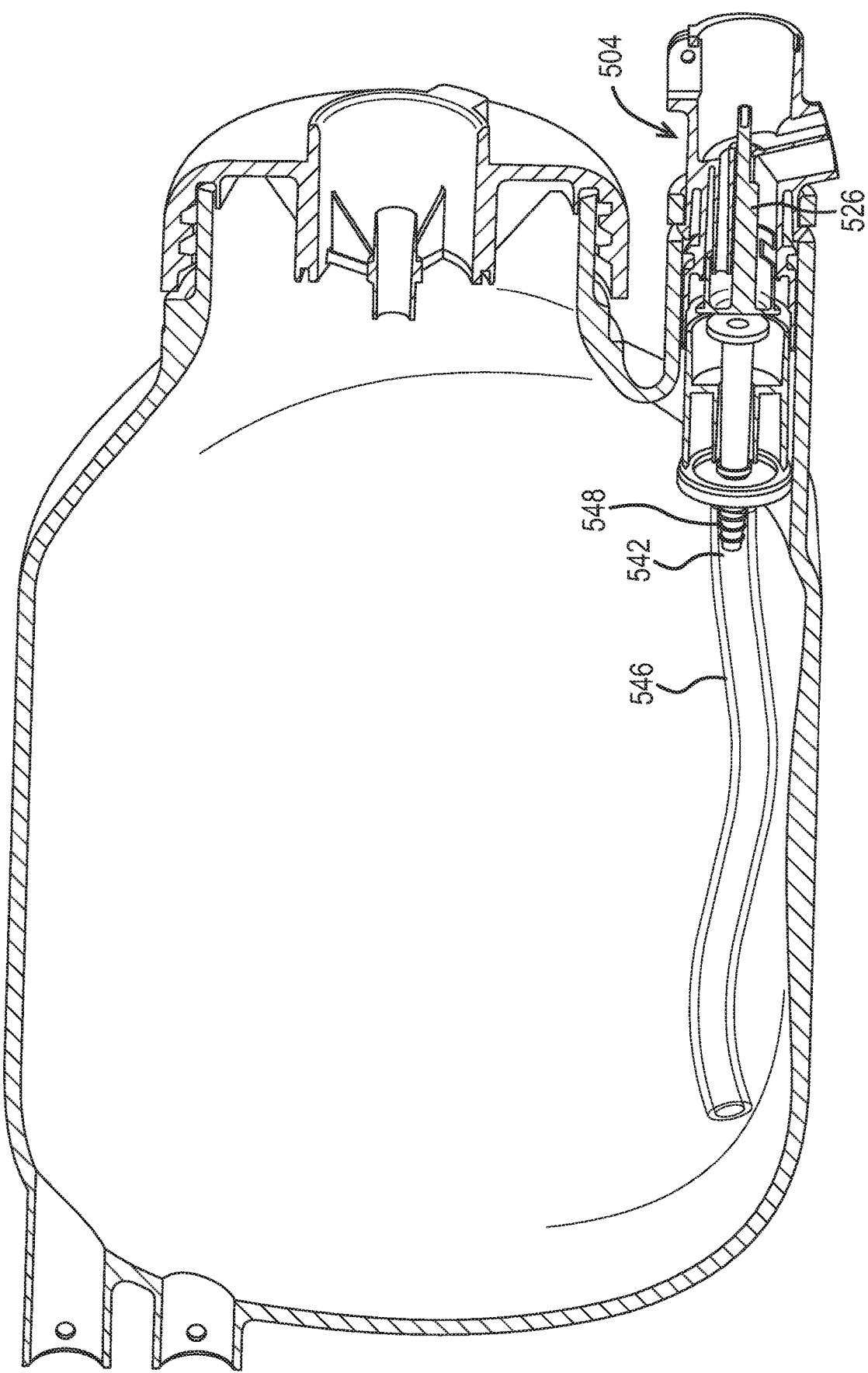
FIGS. 15 and 16 show cross-sectional views of an apparatus having a tap assembly according to the invention.
Figure 16:
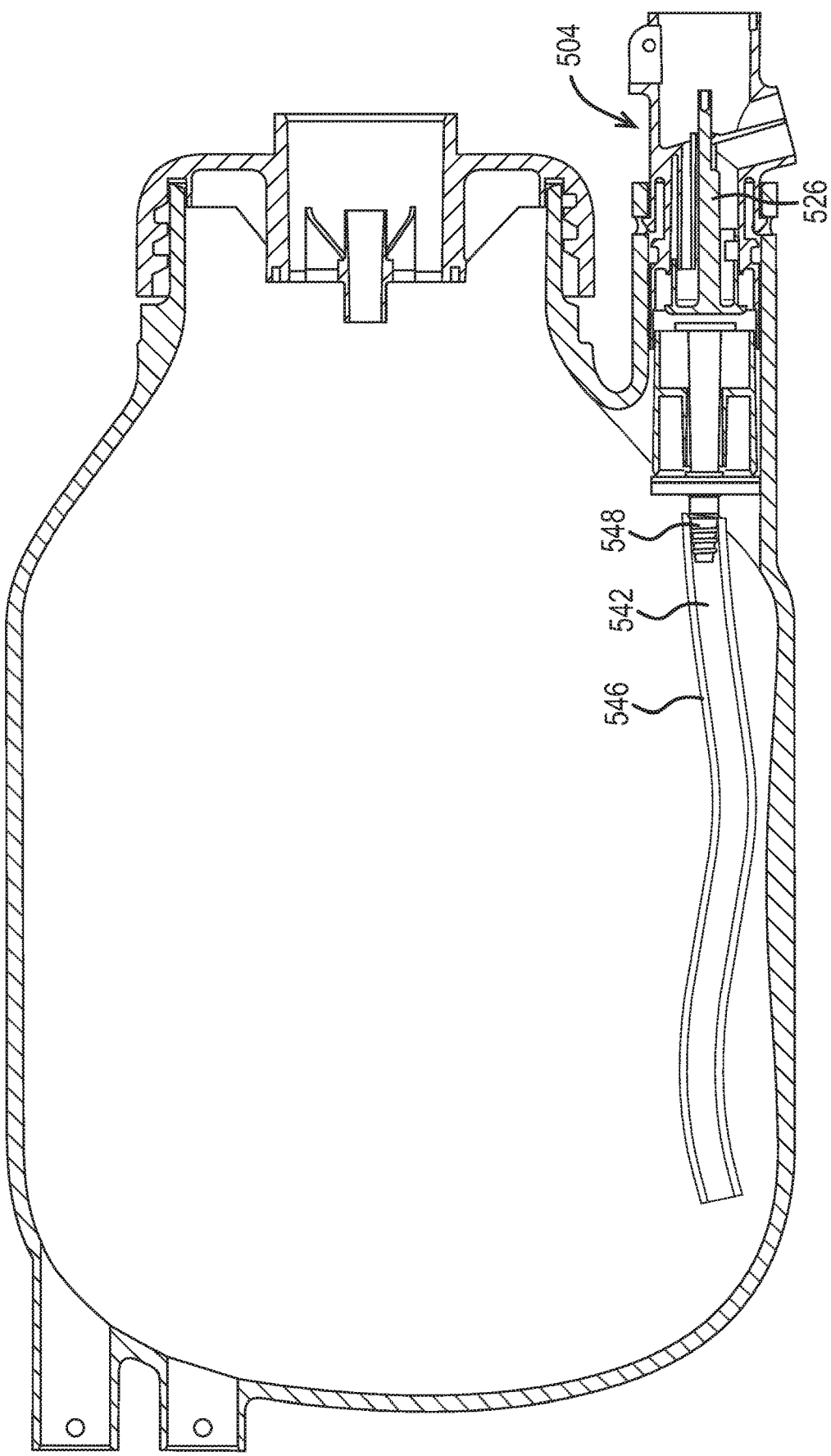

FIGS. 15 and 16 show a further tap assembly 504 according to an embodiment of the invention. The tap assembly may comprise any or all of the features of tap assemblies 204 and 304 described previously.

Figure 12:
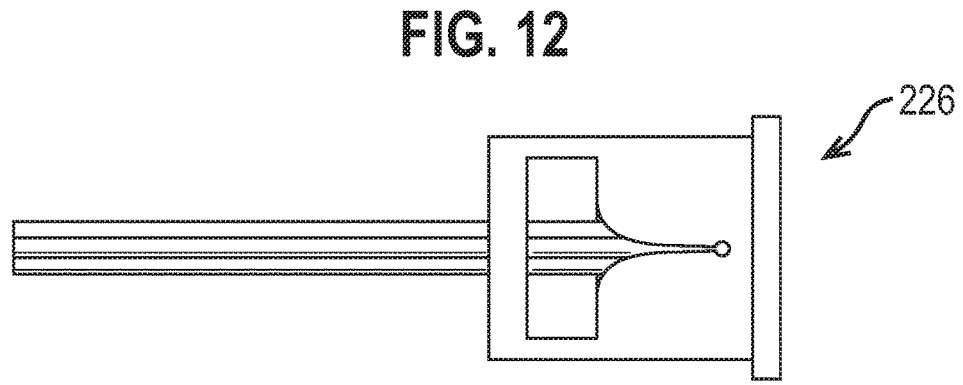
FIG. 12 shows a moveable component of the assembly of FIGS. 10 and 11.

In particular, as will be described below, the tap assembly 504 comprises a movable component 526 that is the same as or substantially the same as movable component 226 shown in FIGS. 10, 11 and 12.

The tap assembly comprises a first conduit 542 for allowing passage of a fluid therethrough and a second conduit 544 for allowing passage of a fluid therethrough. The second conduit 544 is analogous to the aperture 224 of the tap assembly 204 described previously. The movable component 526 is movable between a first position in which passage of fluid is only permitted through the first conduit 542 and at least one second position in which passage of fluid is permitted through both the first conduit 542 and the second conduit 544.

It can be seen that the first conduit 542 comprises a tube 546 (e.g. a flexible tube) that extends into the fermentation apparatus from an anchor 548 within the tap assembly 504. The tube 546 is long and narrow, meaning that the resistance to fluid flow passing through the tube 546 is relatively large which, in turn, restricts the flow rate through the tube 546.

The tap assembly 504 advantageously allows a fermentation container to be tapped selectively via two conduits (the first 542 and second 544 conduits), for example two conduits that resist fluid flow therethrough of the fluid being tapped (e.g. beer). The different resistances may arise from one conduit being longer and/or narrower than the other, in other words the aspect ratio of one conduit may be greater than the other. In the embodiment shown in FIGS. 11 and 12, the first conduit 542 is longer than the second conduit 544 meaning that the flow rate through the first conduit 542 would be restricted more than through the second conduit 544. In some embodiments, the shapes or materials of the first and second conduits may result in the first and second conduits applying different resistances to fluid flow. Such control of resistances is advantageous because it allows for improved control of frothing and fluid flow, resulting in a better beverage (e.g. beer).

Like tap assembly 204, tap assembly 504 further comprises an actuator (not shown) for moving the movable component 526 and a handle (not shown) coupled to the actuator. The handle is configured to be moved a first distance to, in turn, move the movable component 526 a first distance to permit passage of fluid through the first conduit 542 only and a second distance (i.e. further than the first distance) to allow passage of fluid through the first 542 and second 544 conduits. This arrangement, along with the fact that the first 542 and second conduits 544 resist fluid flow to different degrees, allows for optimal frothing and fluid flow throughout the entire tapping procedure, even as the pressure within the fermentation container decreases. For example, where the first conduit 542 applies a greater resistance than the second conduit 544, the handle can be moved a first distance whilst fluid passes through the first conduit 542 only to ensure that the fluid flow is not too fast at high pressure and that the beverage (e.g. beer) is not too frothy. Once the pressure within the fermentation container has reduced by a certain amount, the handle can be moved a second distance and fluid flows through both the first 542 and second 544 conduits. This ensures sufficient fluid flow even at low pressures within the fermentation container because the second conduit 544 applies a lower resistance to the fluid being tapped than the first conduit 542.

Figure 17:
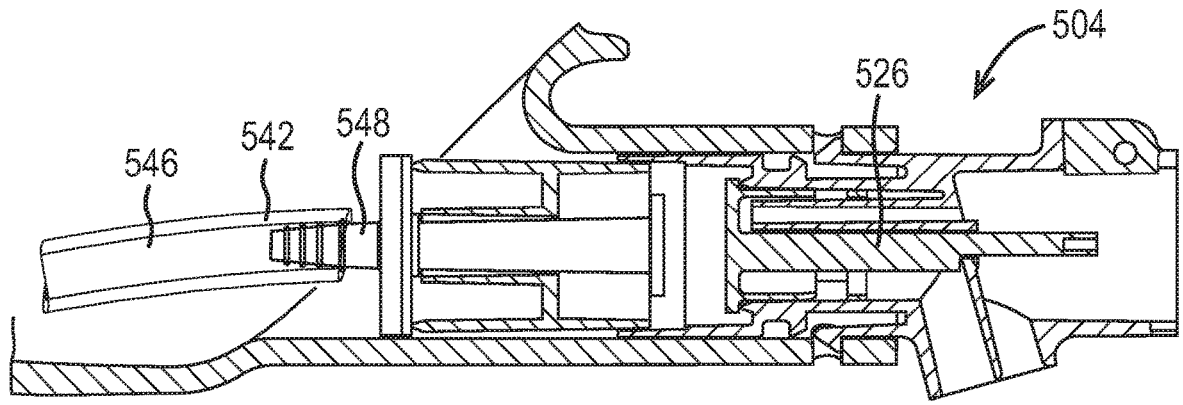
FIGS. 17, 18 and 19 show the tap assembly of FIGS. 15 and 16 in different configurations.
Figure 18:
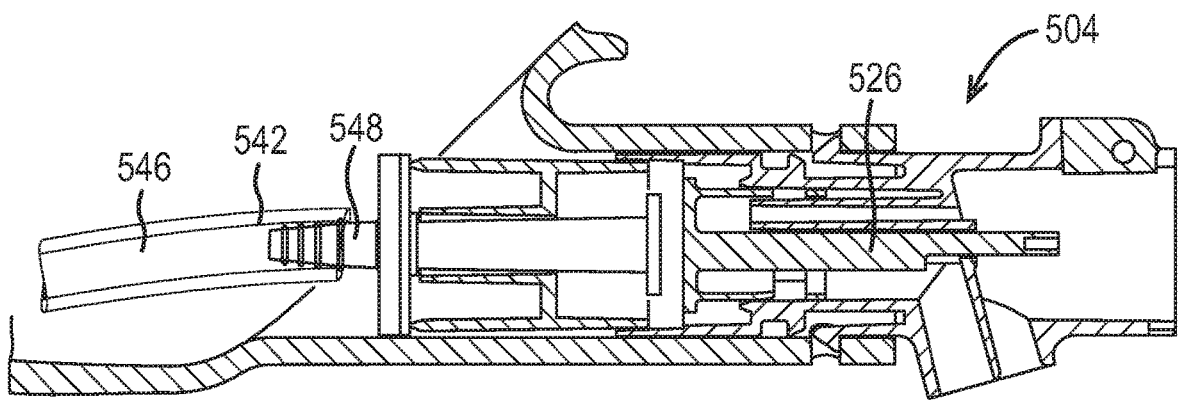
Figure 19:
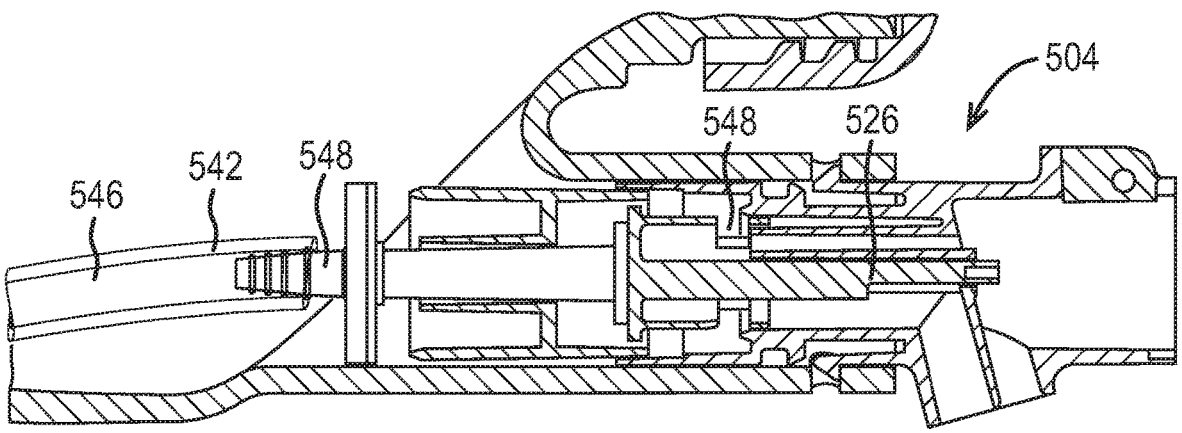

FIGS. 17, 18 and 19 show the tap assembly 504 in various positions.

In the first position shown in FIG. 17, the movable component 526 completely blocks the second conduit 544. This position occurs when the handle has not been moved very far (i.e. early in the tapping) when the pressure inside the fermentation container will be high and because it results in fluid flow through the first conduit 542 only, the flow rate can be controlled and frothing of the beverage can be prevented, and the movable component may allow passage of fluid through the second conduit when the movable component is in one of its second positions. The passage of fluid through the second conduit may be controllable by controlling the portion of the second conduit that is blocked by the moveable component.

FIG. 18 shows the movable component 526 in an intermediate position in which it has advanced towards the fermentation container a certain distance but the second conduit 544 remains closed.

FIG. 19 shows the movable component 526 in a second position in which the second conduit 544 is now open. Once the second conduit 544 is open, the handle can be pulled further to advance the movable component 526 further to progressively increase the size of the second conduit 544 (as described previously with respect to the movable component 226 and the aperture 224). As described previously, it is challenging maintaining a high pressure for well-carbonated beer whilst ensuring a predictable and desirable flow rate. The moveable component 526 of the tap assembly 504 can be moved to a plurality of positions covering the second conduit to differing degrees (preferably continuously to allow an infinite number of positions, although discreet positions could alternatively be provided e.g. using a ratchet mechanism) to control the flow rate through the second conduit 544. The provision of a tap assembly 504 having a moveable component 526 that allows a user to control the portion of the second conduit 544 that is left open for fluid to pass therethrough means that the user can easily control the flow rate depending on how high the pressure is within the fermentation container. If the pressure is high (e.g. when few tappings have taken place), a small second conduit size can be chosen so that the flow rate is restrained. If the pressure is lower (e.g. after more tappings), a larger second conduit can be chosen to provide a sufficient flow. This means that the pressure within the fermentation container can be kept high to begin with, resulting in well-carbonated beverage for longer.

Of course, even when the second conduit 544 is open (i.e. the movable component 526 is in a second position), some fluid may flow through the first conduit 542 and this is not problematic. However, since flow through the second conduit 544 is easier than through the first conduit 542, minimal flow will occur through the first conduit 542 when the second conduit 544 is open.

As described previously, the handle may be attachable to the tap assembly magnetically.

Figure 20:
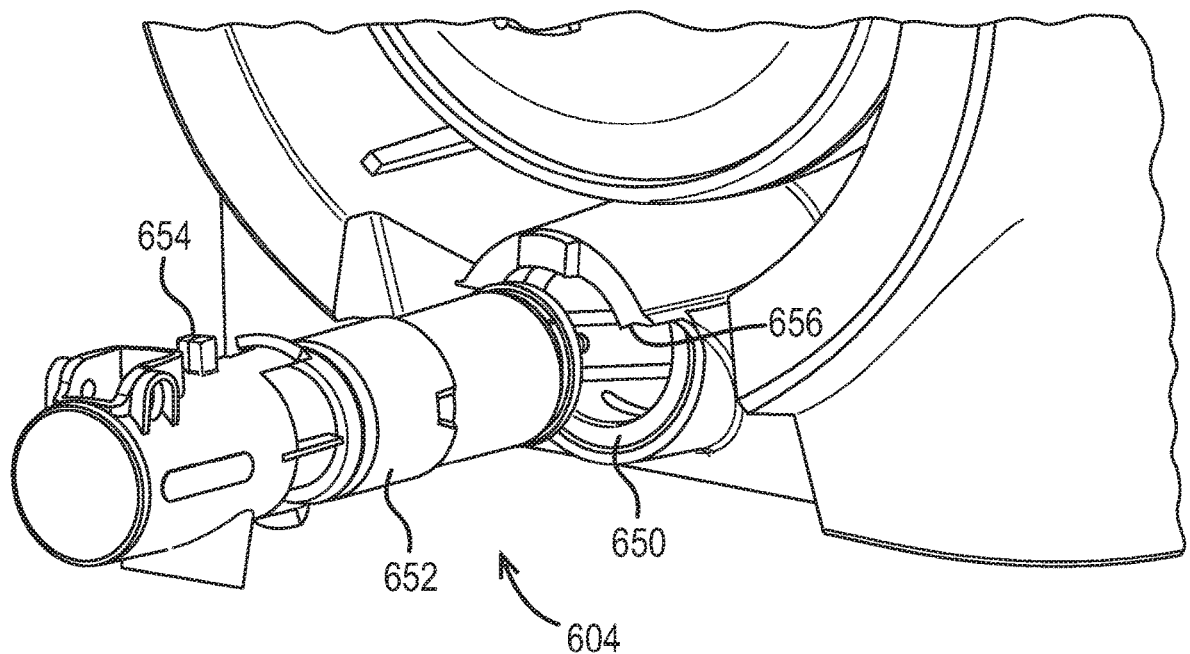
FIG. 20 shows another tap assembly according to the invention prior to installation.

FIG. 20 shows a further tap assembly 604 according to an embodiment of the invention. The tap assembly may comprise any or all of the features of tap assemblies 204, 304 and 504 described previously.

The tap assembly 604 comprises a tap holder 650 and a tap 652 that is removably attachable to the tap holder. As will be described herein, the tap 652 is rotatable relative to the tap holder 650 between a locked position in which removal of the tap 652 from the tap holder 650 is prevented and an unlocked position in which removal of the tap 652 from the tap holder 650 is permitted.

The tap assembly 604 of the invention serves two key purposes. Firstly, it ensures that the user properly attaches the tap 652 to the tap holder 650 before tapping takes place. Secondly, it ensures that the tap 652 is not accidentally detached from the tap holder 650 once the tap 652 has been attached. Both of these results are important in ensuring proper tapping and preventing spillage or danger from the tap becoming detached accidentally.

As shown in FIG. 20, the tap 652 comprises a protrusion 654 extending from an upper portion of the tap 652. The tap holder 650 comprises a channel 656 that is shaped to receive and retain the protrusion 654. The channel has an open end 658 into which the protrusion 654 can be inserted and then rotated to pass through the channel 656. In this way, the tap 652 is rotatable relative to the tap holder 650 in a first direction to move the tap 652 from its unlocked position to its locked position and in a second direction to move the tap 652 from its locked position to its unlocked position. In the figures, the first direction is anti-clockwise and the second direction is clockwise but the skilled person will understand that the converse situation could equally be used.

Figure 21:
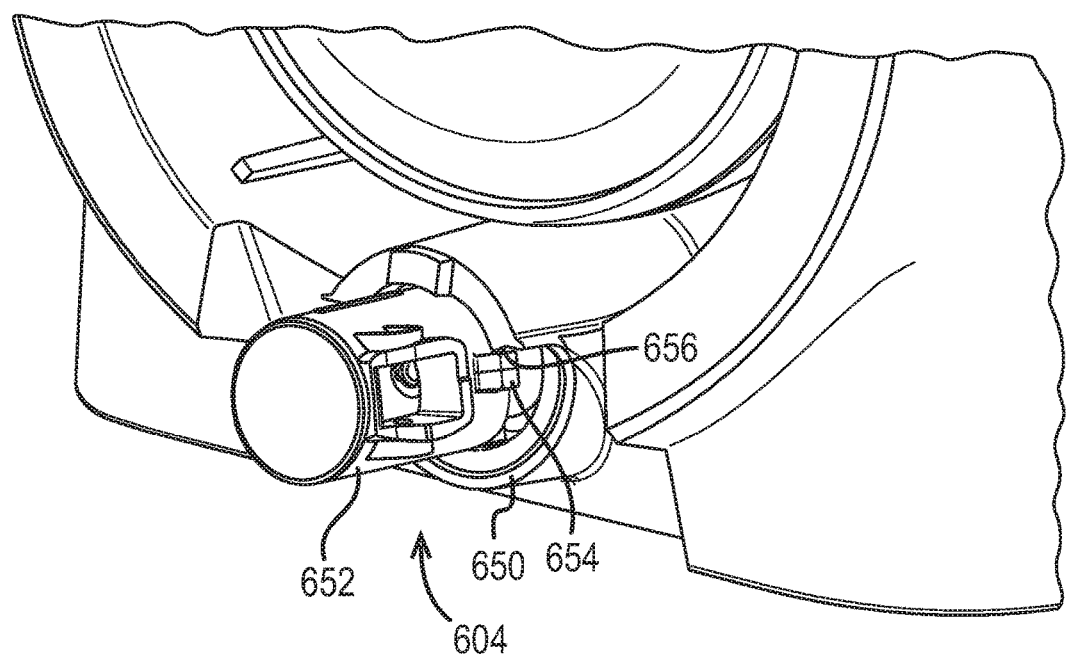
FIG. 21 shows the tap assembly of FIG. 20 with the tap inserted into the tap holder before moving the tap to its locked position.
Figure 22:
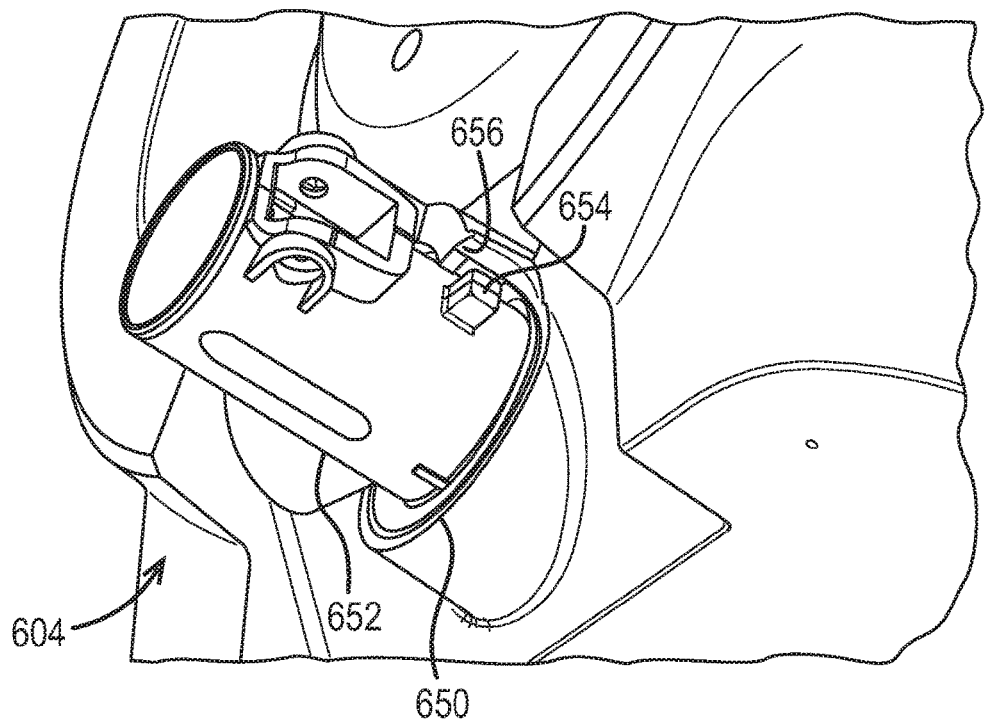
FIG. 22 shows an underneath perspective view of the arrangement of FIG. 21.

FIGS. 21 and 22 show the arrangement of FIG. 20 with the tap 652 positioned ready to be rotated anti-clockwise from its unlocked position to its locked position so that the protrusion 654 enters the channel 656, translates within the channel 656 and is retained by the channel 656.

Whilst the figures show that the tap 652 comprises the protrusion 654 and the tap holder 650 comprises the channel 656, the skilled person will understand that in an alternative embodiment the tap 652 may comprise a channel and the tap holder 650 may comprise a protrusion.

Figure 23:
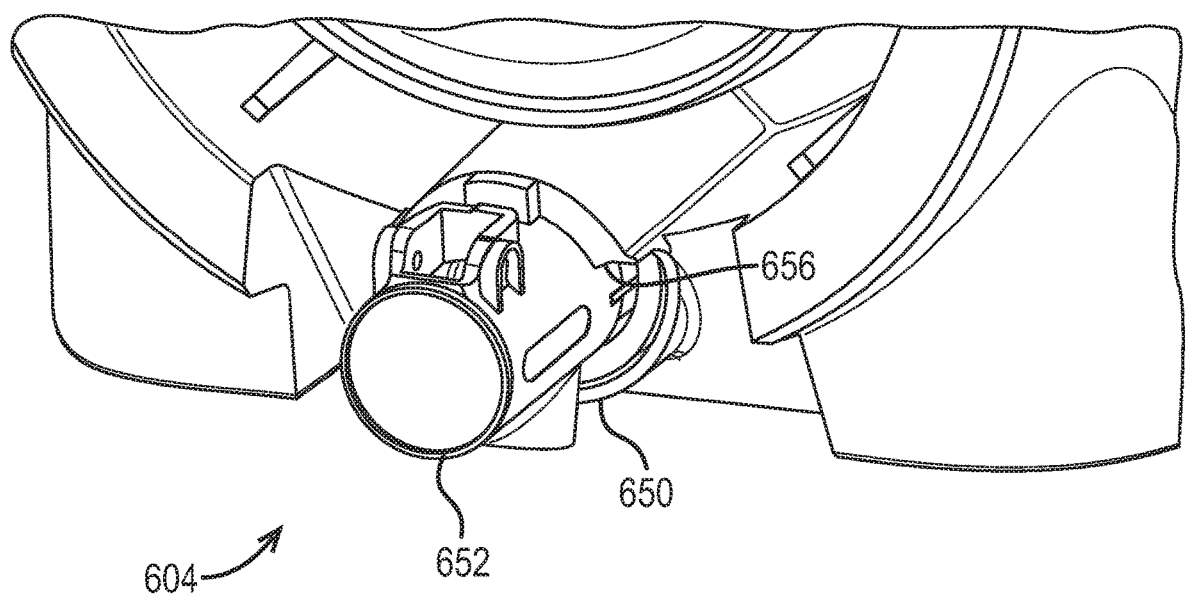
FIG. 23 shows the tap assembly of FIGS. 20 to 22 with the tap in its locked position.

FIG. 23 shows the tap assembly of FIGS. 20 to 22 with the tap 652 in its locked position (i.e. installed within the tap holder 650). Once the tap 652 is in its locked position, the channel 656 of the tap holder 650 then serves the additional purpose of preventing detachment of the tap 652 from the tap holder 650 by retaining the protrusion 654 within the channel 656. This prevents the tap from shooting from the tap holder at pressure even if the user incorrectly installs the tap.

Figure 24:
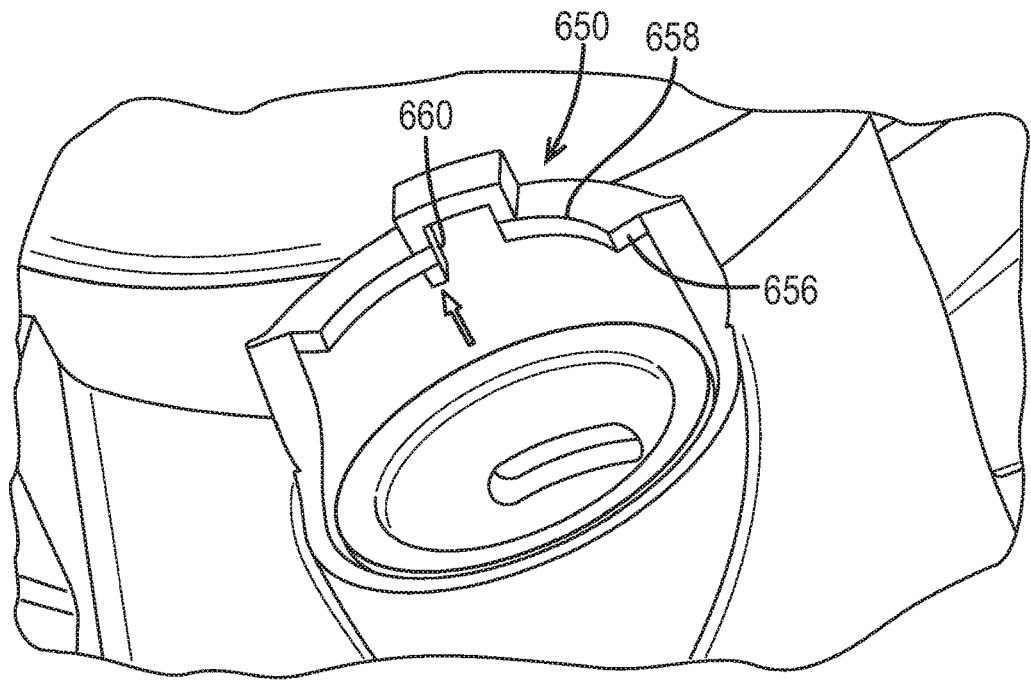
FIG. 24 shows a portion of the tap holder of the tap assembly of FIGS. 20 to 23.

FIG. 24 show a portion of the tap holder 650 of FIGS. 20 to 23. FIG. 24 shows a ridge 658 that defines the channel 656 in which the protrusion 654 of the tap (not shown in FIG. 24) is retained. The tap 652 is also prevented from moving further in the first direction (anti-clockwise in the figures) when the tap 652 is already in its locked position. This prevents damage that could result from a user attempting to attach the tap to the tap holder using excessive force and also indicates to the user when the tap have been attached properly. To achieve this, the tap holder 650 comprises a detent 660 that is configured to abut the protrusion 654 when the tap 652 is in its locked position to prevent the tap 652 from moving further in the first direction when the tap 652 is already in its locked position.

Figure 25:
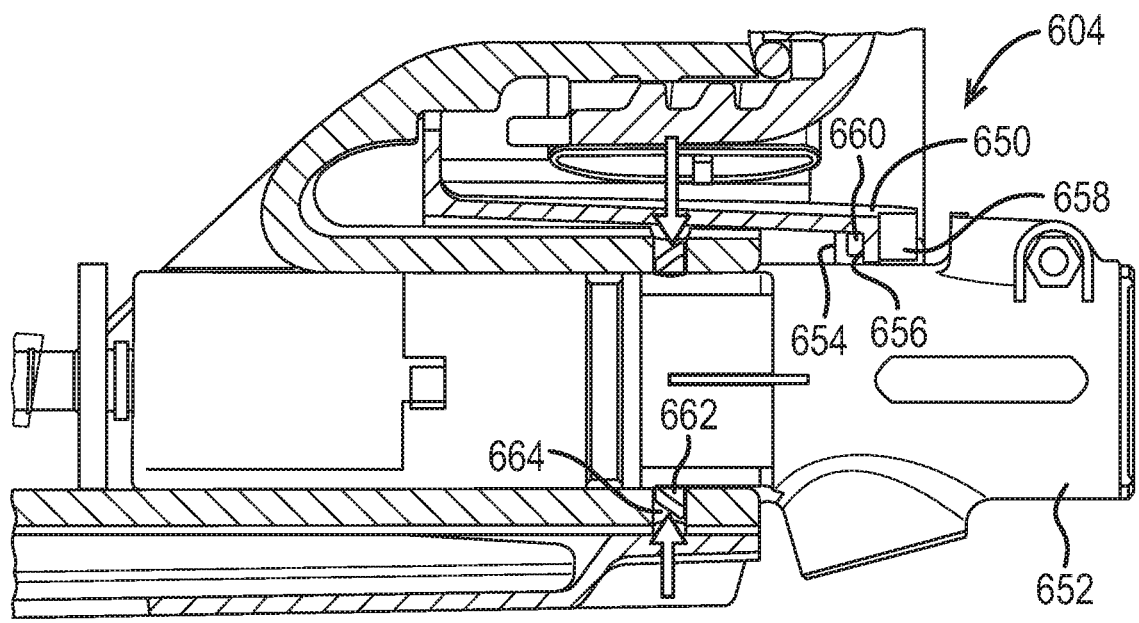
FIG. 25 shows a side cross-sectional view of the tap assembly of FIGS. 20 to 24 with the tap in its locked position.

FIG. 25 shows a side cross-sectional view of the tap assembly 604 with the tap 652 in its locked position. As shown in FIG. 25, the tap assembly 605 further comprises a secondary retention means configured to retain the tap 652 in its locked position. In FIG. 25, the secondary retention means comprises a pair of resilient clips 662 on the tap 652 that are received in a pair of corresponding recesses 664 in the tap holder 650. The skilled person will understand that other suitable secondary retention means could be used. The secondary retention means is configured to be engaged automatically when the tap 652 is moved to its locked position.

Figure 26:
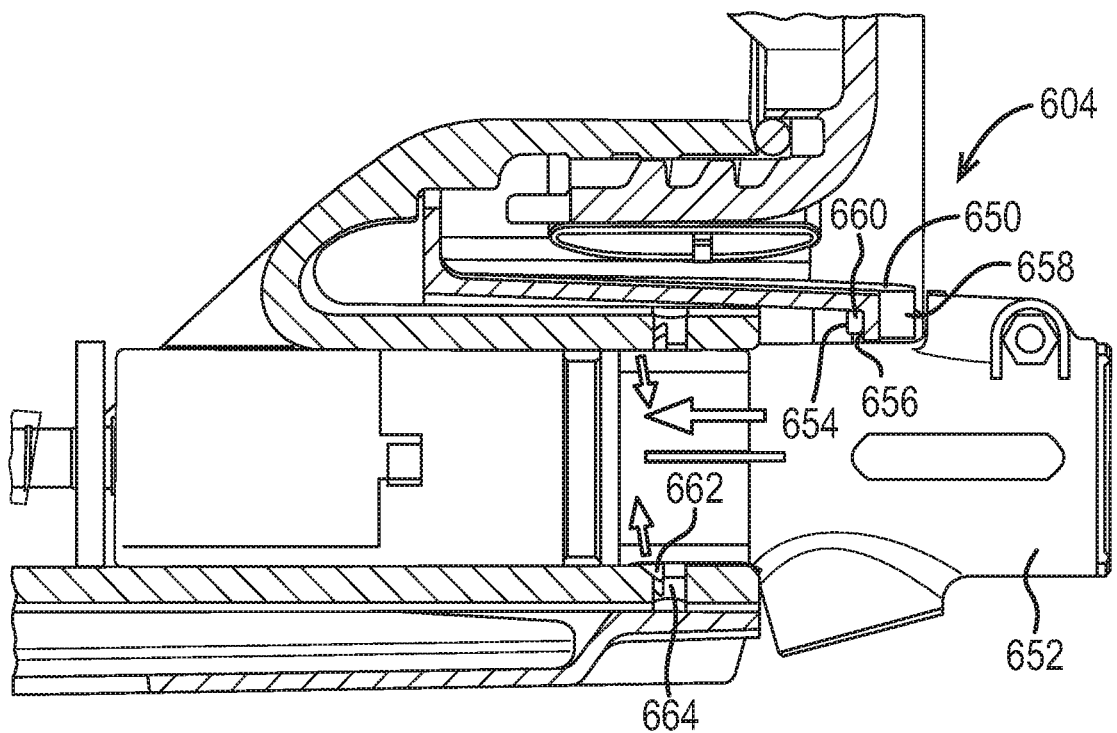
FIG. 26 shows the arrangement of FIG. 25 during removal of the tap from the tap holder.

FIG. 26 shows the arrangement of FIG. 25 with the secondary retention means disengaged ready to detach the tap 652 from the tap holder 650. As can be seen from FIG. 26, the clips 662 are disengaged from their corresponding recesses 664 by moving the tap 652 axially towards the tap holder 650. Once this has been done, the tap 652 can be rotated clockwise from its locked position to its unlocked position by translating the protrusion 654 within the channel 656 until the protrusion 654 is no longer retained by the channel 656. Once this has been done, the tap 652 can be removed from the tap holder 650. The requirement to move the tap 652 first axially and then rotationally to detach the tap 652 from the tap holder 650 further enhances the safety of the arrangement because this is a deliberate motion that would not occur accidentally.

FIG. 27 shows a valve 770 for a fermentation container and FIG. 28 shows an exploded view of the valve 770. The valve 770 can be used with any of the fermentation containers described herein, for example fermentation containers 202, 302, 402. For example, the valve 770 can be used in place of or in addition to valve 210 described previously.

The valve 770 comprises an aperture (not shown in FIGS. 27 and 28), a stopper 772 configured to at least partially seal the aperture, and an actuator 774 which takes the form of a twist cap. The twist cap 774 comprises a grip 775 that is shaped to make it easy and convenient for a user to grasp and rotate. The valve 770 also comprises a spring 776 arranged between the actuator 774 and the stopper 772. The valve 770 also comprises a non-rotating plunger 782 that is configured to couple the actuator 774 to the spring 776 and the stopper 772, a valve body 784 that is configured to receive and house the stopper and the spring, and a screw 786 to attach the various components together. The stopper 772 comprises an elongate spindle 777 that is configured to receive the spring 776 and prevent the spring 776 from becoming twisted.

The actuator 774 is configured to apply variable force to the stopper 772 to vary the resistance of the valve. The provision of a valve where the resistance of the valve can be varied is highly advantageous as this allows for the pressure within the fermentation container to be controlled and varied. This is important as it means that a wide variety of beverages (e.g. lagers, ciders, bitters, stouts, ales) can be fermented at their optimal pressure, resulting in the optimal carbonation. For example, a lager would be brewed at high pressure for a greater degree of carbonation whereas a stout would be brewed at low pressure for little or no carbonation.

The actuator 774 is configured to apply variable force to the spring 776 to variably compress the spring 776, and the spring 776 in turn is configured to apply variable force to the stopper 772 to vary the resistance of the valve. In other words, the resistance of the valve (and therefore the pressure within the fermentation container) can be controlled and varied by varying the compression of the spring by applying different forces to the spring 776 via the actuator 774. The figures show a helical compression spring, but the skilled person will understand that a leaf spring or any other suitable spring or biasing means or resilient member could equally be used.

The actuator 774 is rotatable vary the force applied to the stopper 772. Rotation of the actuator is a convenient and compact way for a user to vary the pressure within the fermentation container. In particular, the actuator comprises a screw thread 778 extending around its circumference that is configured to engage and translate about a protrusion 780 on the valve body 784. The screw thread 778 is shown extending fully through the wall of the actuator 774 but the skilled person will understand that a partial recess could be used. Additionally, the skilled person will understand that the actuator could comprise a protrusion and the valve body could comprise a screw thread.

When the actuator 774 is rotated, it screws upwards or downwards on the valve 770 which varies the force applied to the spring 776 and consequently the force applied to the stopper, meaning that the resistance of the valve 770 is adjusted. This provides a predictable and reliable movement of the actuator and, consequently, a predictable and reliable variation of the resistance of the valve and therefore the pressure within the fermentation container.

As examples, FIG. 29A shows the valve 770 at a pressure of 2.5 Bar, FIG. 29B shows the valve 770 at a pressure of 0.2 Bar and FIG. 29C shows the valve 770 open. The different positions of the actuator 774 at different pressures can clearly be seen in these figures. The varying aperture 771 can also be seen.

FIGS. 30 to 34 show another apparatus 800 according to an embodiment of the invention. The apparatus 800 may have any or all of the features and modes of operation of any of the apparatuses (e.g. apparatuses 200, 300, 400) described previously and the skilled person will understand that any of the features of the various embodiments may be combined in any suitable manner.

The apparatus comprises a fermentation container 802 for containing and fermenting a beverage (e.g. beer or cider) and a cap 882 that is attachable to the fermentation container 802 and is configured to seal the fermentation container 802 when the cap 882 is attached to the fermentation container 802. The cap 882 is attachable to and detachable from the fermentation container 802 via corresponding screw threads (not shown) on the cap 882 and the fermentation container 802.

Figure 31:
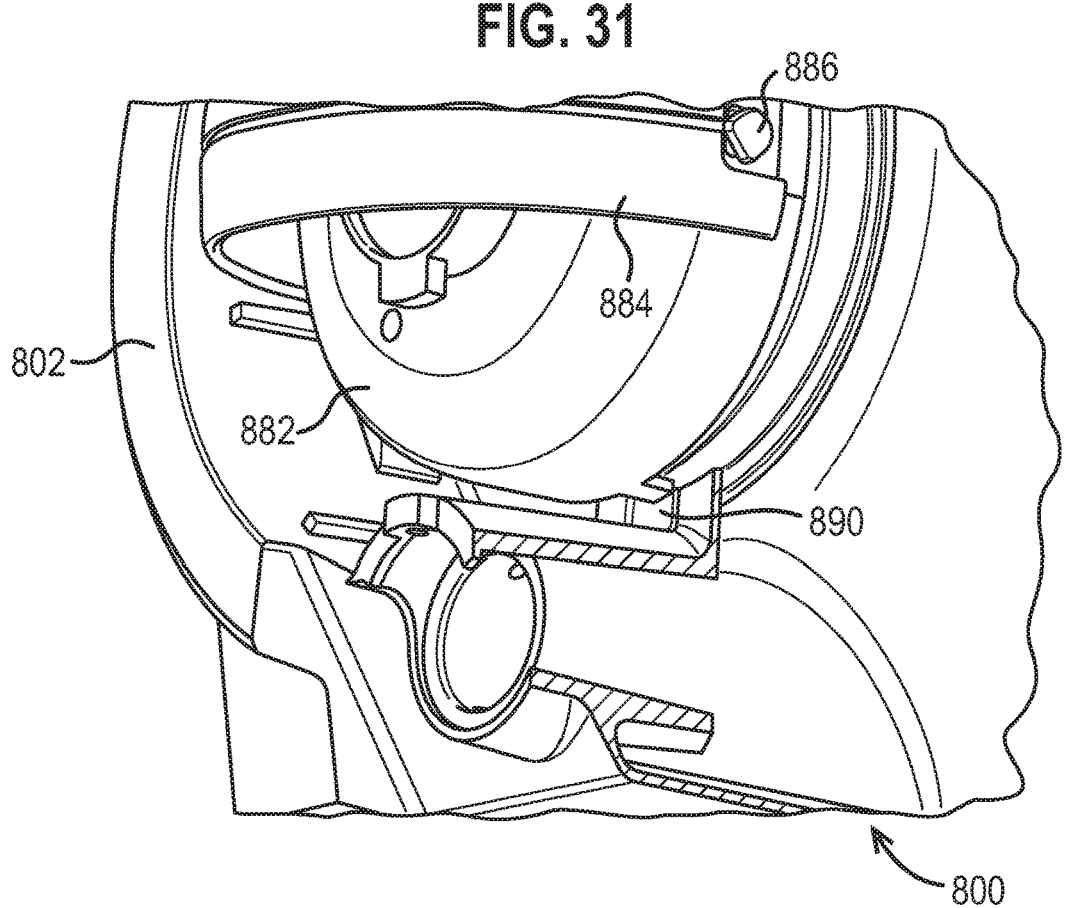
FIG. 31 shows a partial view of the fermentation apparatus of FIG. 30.
Figure 30:
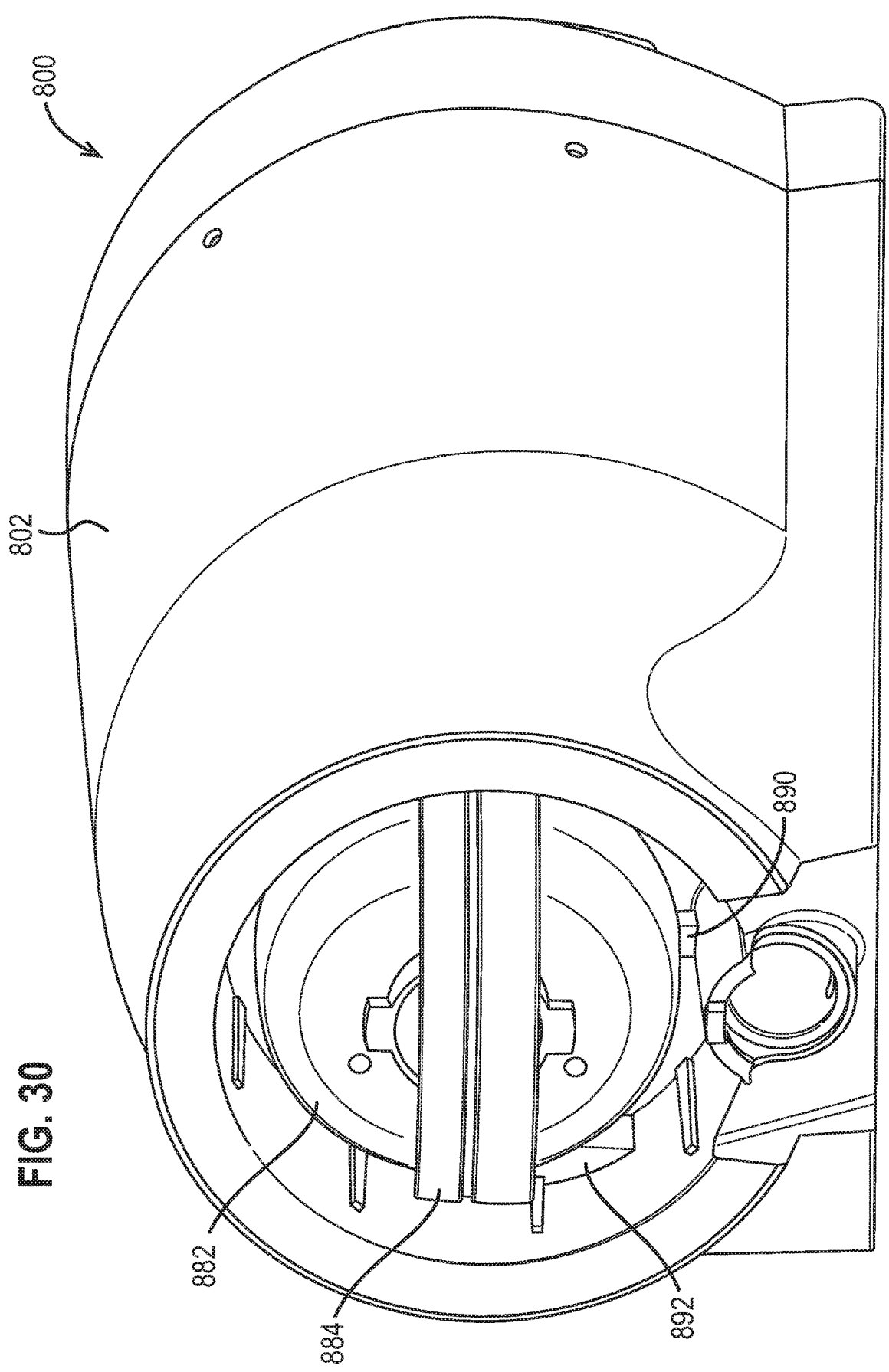
FIG. 30 shows another fermentation apparatus according to the invention with the handle in a first position.
Figure 32:
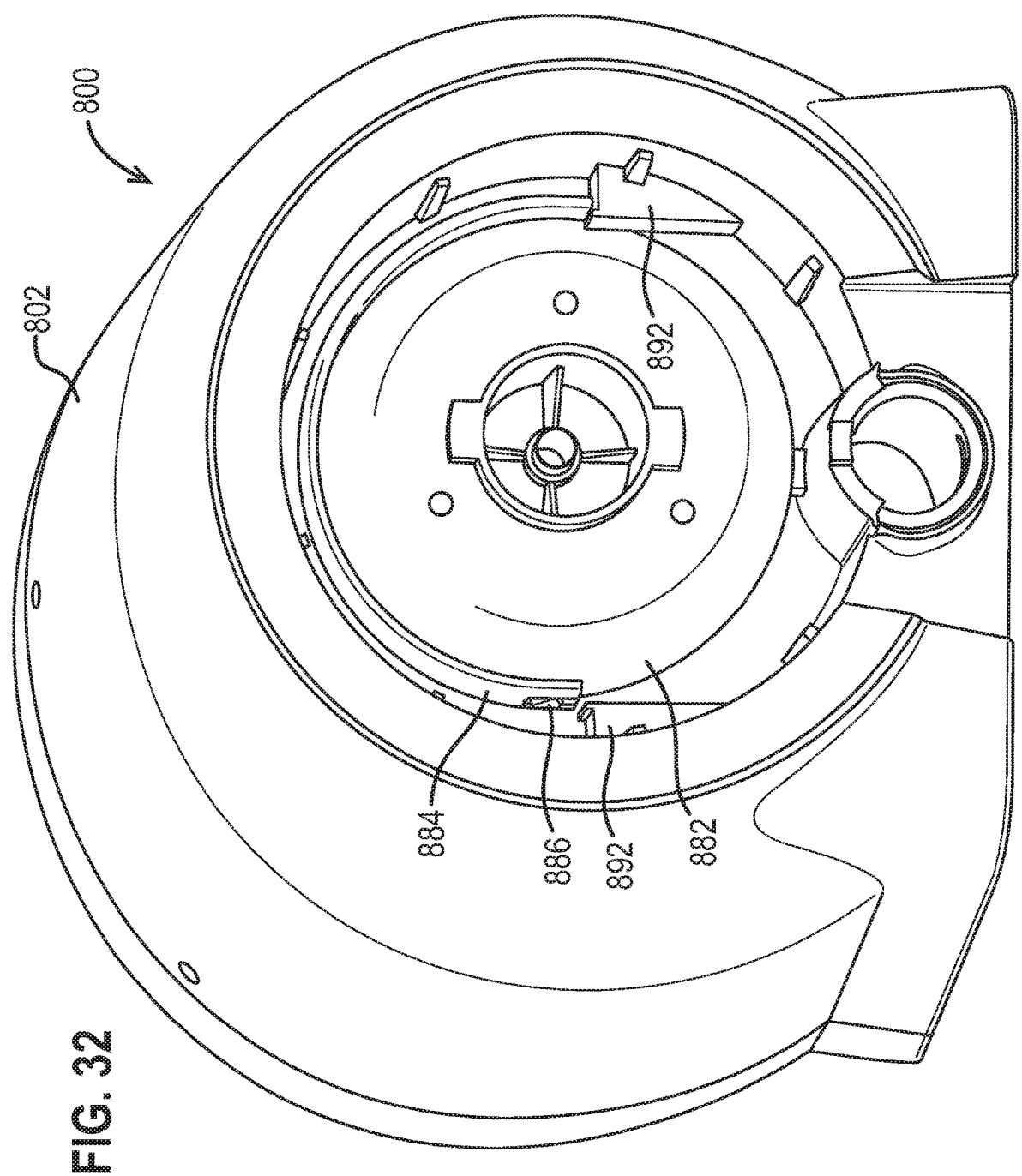
FIG. 32 shows the fermentation apparatus of FIGS. 30 and 31 with the handle in a second position.

The cap 882 comprises a handle 884 that is rotatable about pivots 886 (e.g. screws or nuts)) between a first position in which the handle 884 is graspable by a user (i.e. where the handle 884 extends perpendicularly to the surface of the cap 882, as shown in FIGS. 30 and 31) and a second position in which the handle 884 lies coplanar with the cap 882 (as shown in FIG. 32). The handle 884 is shaped to enclose the cap 882 when the handle is in its second position (FIG. 32).

The attachment of the cap 882 to the fermentation container 802 will now be described. To aid this discussion, FIG. 35 shows the fermentation container 802 of FIGS. 30 to 34 with the cap removed. It can be seen that the portion of the fermentation container 802 that receives the cap comprises a detent 890 and two opposing abutments 892 positioned at 90 degrees in either direction from the detent 890.

The present invention advantageously provides a convenient and elegant way of preventing the cap from being detached from the fermentation container accidentally during fermentation by using the handle as a part of the locking mechanism. This removes the need for additional locking features which simplifies the design.

FIG. 30 shows the cap 882 screwed onto the fermentation container 802. As shown in FIG. 31, the cap 882 is screwed onto the fermentation container 802 until a detent 892 on the cap aligns with the corresponding detent 890 on the fermentation container 802. This is a convenient and effective way of indicating to the user that the cap has been properly attached to the fermentation container.

Once the cap 882 has been screwed onto the fermentation container 802, the handle 884 can be rotated to the position shown in FIG. 32, as described previously. The handle 884 is only movable from its first position to its second position in a first direction and not in a second direction that is opposed to the first direction because it is prevented from moving in the second direction by the abutments 892.

Figure 33:
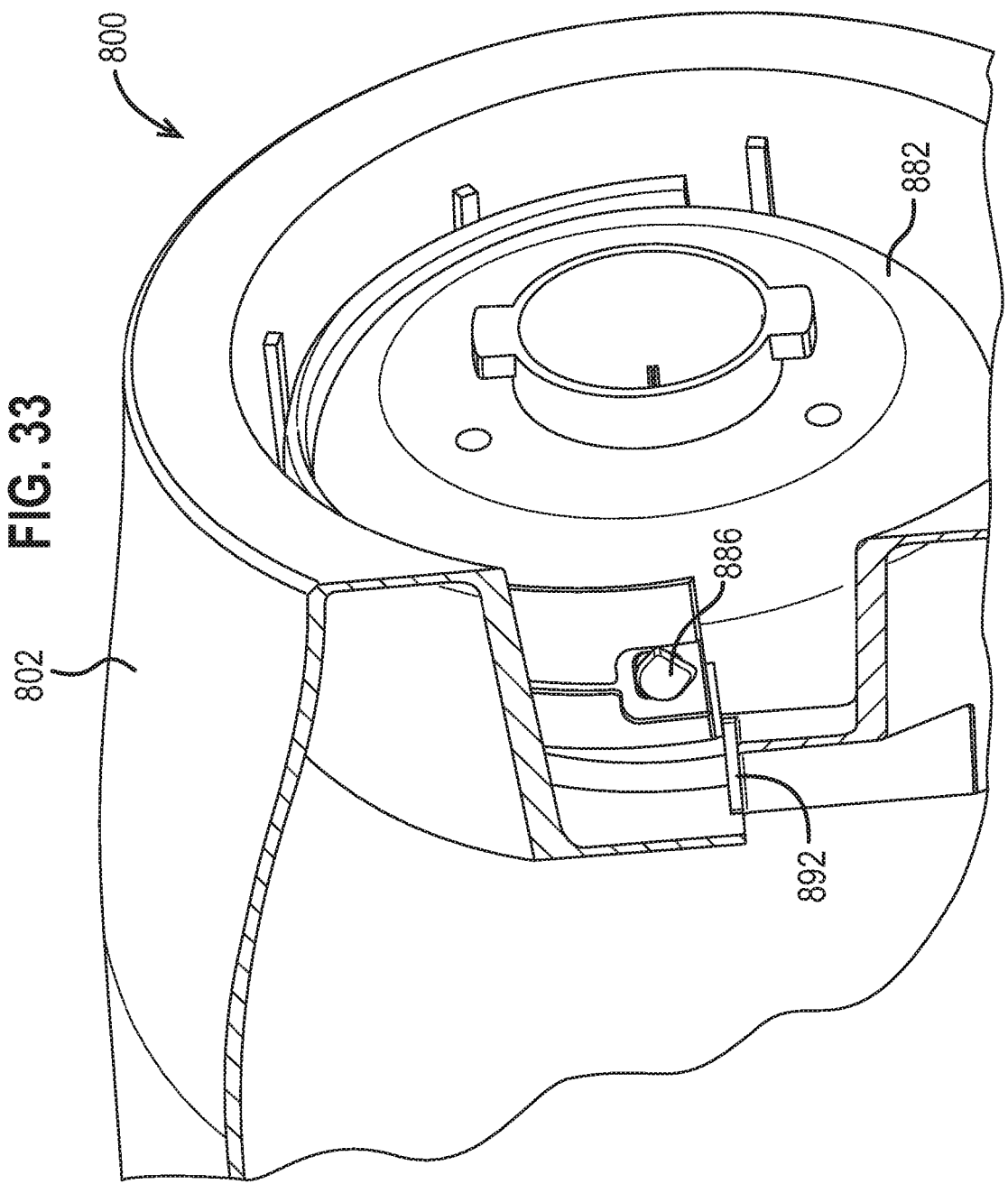
FIG. 33 shows a cut away view of the arrangement of FIG. 32.

As shown in FIG. 33, when the handle 884 is in its second position, the handle lies behind the abutments 892 and therefore the abutments 892 prevent rotation (and removal) of the cap because they restrict the movement of the handle 884.

The present invention therefore provides a neat and effective way of preventing accidental removal of the cap using the existing handle of the cap.

As in other embodiment, the fermentation apparatus 800 may further comprise a collector 806 (i.e. a yeast dump as described previously) that is attachable to the fermentation container 802 to collect waste from the fermentation container 802. The collector 806 may have any or all of the features of other collectors (e.g. collectors 202, 302, 402).

Figure 34:
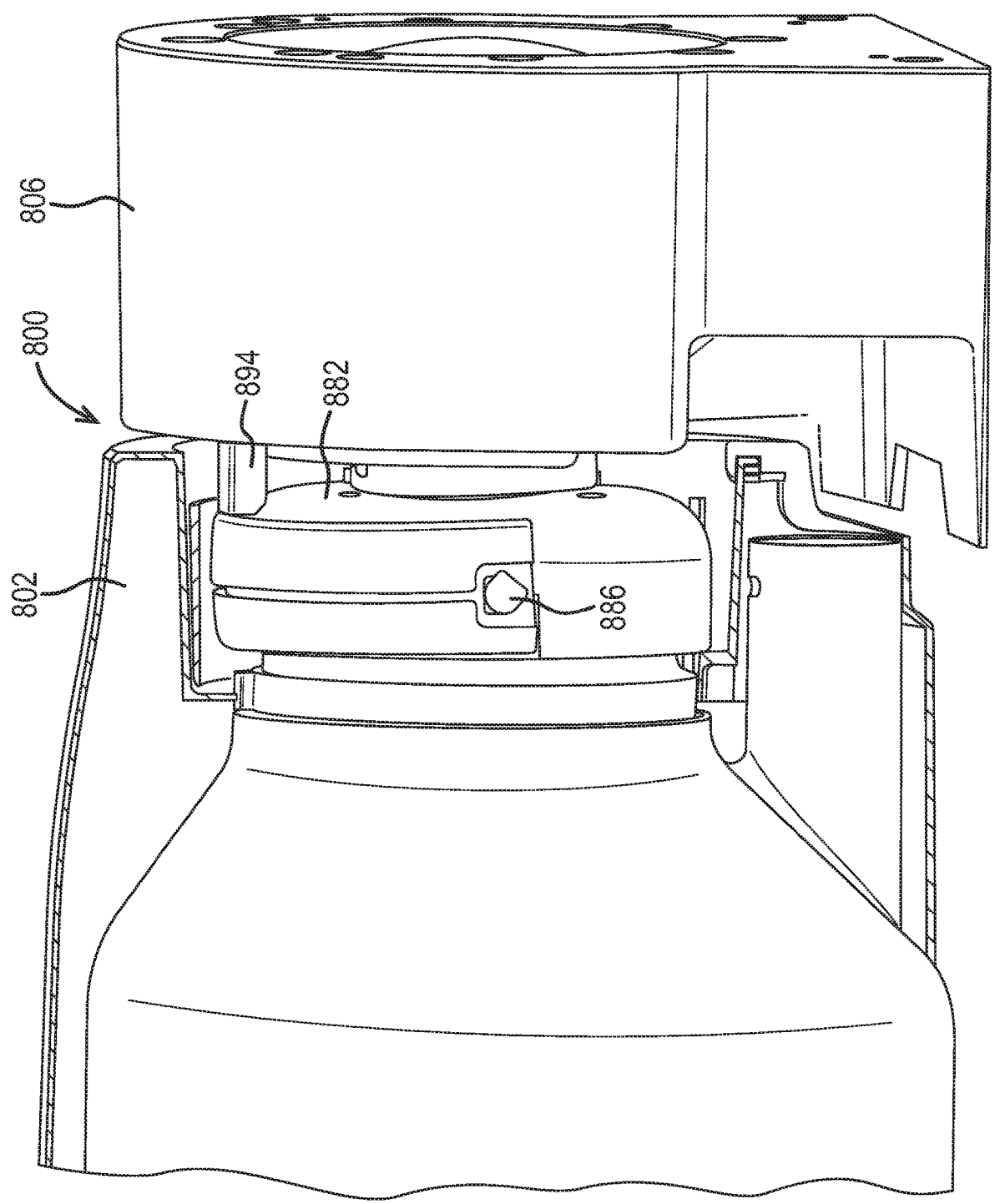
FIG. 34 shows a cut away view of the arrangement of FIGS. 32 and 33 during the process of attaching a collector.
Figure 35:
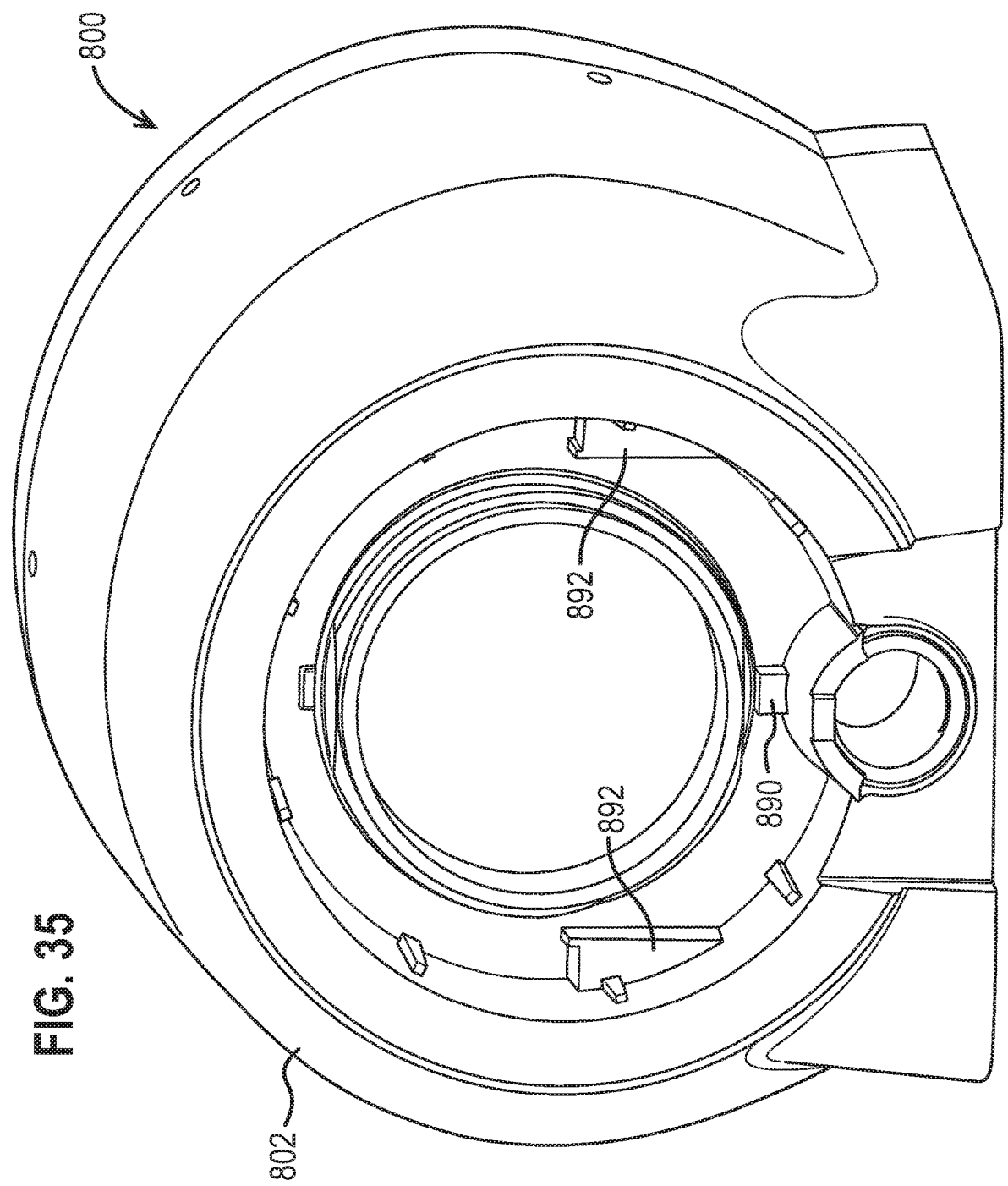
FIG. 35 shows the fermentation container of FIGS. 30 to 34 with the cap removed.

As shown in FIG. 34, the collector 806 comprises a projection 894 that is configured to engage the handle 884 when the handle 884 is in its second position to prevent the handle 884 from moving to its first position. In other words, the collector 806 is shaped (via the projection 894) to retain the handle 884 in its second position whilst the collector 806 is being attached to or detached from the fermentation container 802 so that accidental removal of the cap is prevented whilst this process is taking place. This adds an extra degree of security to the apparatus 800.

The present invention has been described above in exemplary form with reference to the accompanying drawings which represent a single embodiment of the invention. It will be understood that many different embodiments of the invention exist, and that these embodiments all fall within the scope of the invention as defined by the following claims.

The invention claimed is:

1. An apparatus for brewing and dispensing a beverage, such as an alcoholic beverage, comprising:
   a fermentation container for containing and fermenting a beverage, the fermentation container comprising a first outlet;
   a collector for collecting waste from the fermentation container, the collector being attachable to and detachable from the fermentation container at the first outlet,
   wherein the first outlet is moveable between: a first position in which the first outlet is configured to form a pressure-tight seal to seal the fermentation container when the collector is not attached to the fermentation container; and
   a second position in which the first outlet is configured to allow fluid communication between the fermentation container and the collector when the collector is attached to the fermentation container so that waste from the fermentation container collects in the collector; and
   a tap assembly that is attachable to and detachable from the fermentation container for dispensing a beverage from the fermentation container,
   wherein the collector is configured to enclose the tap assembly when the collector is attached to the fermentation container and to expose the tap assembly when the collector is not attached to the fermentation container.

2. The apparatus of claim 1, wherein the first outlet is moveable from its first position to its second position by attaching the collector to the fermentation container.

3. The apparatus of claim 1, wherein the first outlet is moveable from its second position to its first position by detaching the collector from the fermentation container.

4. The apparatus of claim 1, wherein the first outlet comprises a plug that is moveable between a first position in which the first outlet is in its first position and a second position in which the outlet is in its second position.

5. The apparatus of claim 4, wherein the plug is moveable inwardly towards or into the fermentation container to move the plug from its first position to its second position.

6. The apparatus of claim 4, wherein the collector is configured to abut the plug to move it from its first position to its second position.

7. The apparatus of claim 4, wherein the plug comprises a body portion having a first surface that is a planar surface that is configured to sealingly engage a corresponding surface on an interior surface of the fermentation container to seal the fermentation container when the plug is in its first position.

8. The apparatus of claim 1, wherein the fermentation container comprises a second outlet and the tap assembly is attachable to the fermentation container at the second outlet to allow fluid communication between the fermentation container and the tap assembly to dispense a beverage from the fermentation container.

9. The apparatus of claim 1, wherein the tap assembly is attachable to the fermentation container by a resilient fit, a snap-fit or an interference fit.

10. The apparatus of claim 1, wherein the tap assembly comprises a handle that is attachable to and detachable from the tap assembly to facilitate actuation of the tap assembly.

11. The apparatus of claim 10, wherein the tap assembly is actuatable by rotating the handle about a pivot of the tap assembly.

12. The apparatus of claim 1, wherein the fermentation container further comprises a safety valve for allowing gas to exit the fermentation container during fermentation.

13. The apparatus of claim 1, wherein the tap assembly and a safety valve are located at diagonally opposite corners of the fermentation container when the tap assembly is attached to the fermentation container.

14. The apparatus of claim 1, wherein the fermentation container has a first axis and a second axis that is perpendicular to the first axis,
   wherein the fermentation container is configured to be oriented with the first axis being vertical and the second axis being horizontal during fermentation, and
   wherein the fermentation container is configured to be oriented with the first axis being horizontal and the second axis being vertical for a fermented beverage to be dispensed via the tap assembly.

15. The apparatus of claim 1, wherein the fermentation container further comprises a dosing valve for injecting brewing ingredients into the fermentation container whilst maintaining the pressure within the fermentation container.

16. The apparatus of claim 1, wherein the fermentation container is configured to use the $CO_2$ produced during primary fermentation to carbonate the beverage.

17. An apparatus for brewing and dispensing a beverage, such as an alcoholic beverage, comprising:
   a fermentation container for containing and fermenting a beverage, the fermentation container comprising a first outlet;
   a collector for collecting waste from the fermentation container, the collector being attachable to and detachable from the fermentation container at the first outlet,
   wherein the first outlet is moveable between:
      a first position in which the first outlet is configured to form a pressure-tight seal to seal the fermentation container when the collector is not attached to the fermentation container; and
      a second position in which the first outlet is configured to allow fluid communication between the fermentation container and the collector when the collector is attached to the fermentation container so that waste from the fermentation container collects in the collector; and
   a tap assembly that is attachable to and detachable from the fermentation container for dispensing a beverage from the fermentation container,
   wherein the collector is configured to prevent actuation of the tap assembly when the collector is attached to the fermentation container and to allow activation of the tap assembly when the collector is not attached to the fermentation container.

18. The apparatus of claim 17, wherein the first outlet is one or both of:
   moveable from its first position to its second position by attaching the collector to the fermentation container; and
   moveable from its second position to its first position by detaching the collector from the fermentation container.

19. The apparatus of claim 17, wherein the fermentation container is configured to use the $CO_2$ produced during primary fermentation to carbonate the beverage.

* * * * *